(12) United States Patent
Winter et al.

(10) Patent No.: US 12,459,661 B2
(45) Date of Patent: Nov. 4, 2025

(54) HEAT SHIELD FOR AN AIRCRAFT AND METHOD OF USING THE SAME

(71) Applicant: The Boeing Company, Arlington, VA (US)

(72) Inventors: Eric G. Winter, Freeland, WA (US); Leanne L. Lehman, Aliso Viejo, CA (US); William C. Cromer, Seattle, WA (US); Mark D. Gilcreest, Lynnwood, WA (US); Ryan J. Clabots, Mukilteo, WA (US); Matthew J. Woerly, Renton, WA (US)

(73) Assignee: The Boeing Company, Arlington, VA (US)

( * ) Notice: Subject to any disclaimer, the term of this patent is extended or adjusted under 35 U.S.C. 154(b) by 184 days.

(21) Appl. No.: 18/162,428

(22) Filed: Jan. 31, 2023

(65) Prior Publication Data
US 2024/0253805 A1    Aug. 1, 2024

(51) Int. Cl.
*B64D 33/08*    (2006.01)
*B64D 27/18*    (2006.01)

(52) U.S. Cl.
CPC .............. *B64D 33/08* (2013.01); *B64D 27/18* (2013.01)

(58) Field of Classification Search
CPC ........ B64D 33/08; B64D 27/18; B64D 29/02; B64D 33/04
See application file for complete search history.

(56) References Cited

U.S. PATENT DOCUMENTS

| | | |
|---|---|---|
| 8,844,862 B2 | 9/2014 | Journade |
| 9,688,412 B2 | 6/2017 | Peyruseigt et al. |
| 11,338,902 B2 | 5/2022 | Logan, Jr. et al. |
| 2013/0105622 A1* | 5/2013 | Journade ............... B64D 33/04 244/54 |
| 2021/0078692 A1* | 3/2021 | Logan, Jr. ............. B64D 33/04 |

\* cited by examiner

*Primary Examiner* — Kimberly S Berona
*Assistant Examiner* — Steven J Shur

(57) ABSTRACT

There is provided a heat shield for an aircraft. The heat shield has a pair of side skins. Each side skin is formed of a heat resistant material and has a side skin edge. The heat shield further has a lower skin formed of a heat resistant material and having lower skin edges. The lower skin edges extend an extended length past the side skin edges. The lower skin edges are separate from the side skin edges. A gap is formed between the side skin edges and the lower skin. The lower skin is configured to thermally expand without contacting the pair of side skins. The heat shield further has a plurality of frame members attached to the lower skin. The heat shield further has an air ingress restrictor assembly associated with one of, the pair of side skins, or the lower skin.

20 Claims, 10 Drawing Sheets

HEAT SHIELD FOR AN AIRCRAFT AND METHOD OF USING THE SAME

FIELD

The present disclosure relates generally to aircraft and more specifically to a heat shield for an aircraft.

BACKGROUND

Aircraft components are exposed to extreme temperatures during operation. Heat shields are provided in aircraft to protect temperature sensitive components from extreme temperatures. During operation of an aircraft, jet engines of the aircraft output a heated exhaust gas that propels the aircraft in a forward direction. Components such as strut aft fairings positioned behind the jet engines may be undesirably affected by extreme heat. Strut aft fairings beneath the wings are protected from the heated exhaust gas by heat shields adjacent to the jet engines. Such heat shields typically include side skins and a lower skin which may be exposed to extreme and variable temperatures.

In one known heat shield design, the side skins and the lower skin are firmly attached with fasteners, such as a double row of rivet fasteners, along the length of the heat shield. Such attachment of the side skins and the lower skin of the heat shield may constrain a differential thermal expansion, or a relative change in size between the side skins and the lower skin. Moreover, such attachment of the side skins and the lower skin may expose edges of the lower skin to a cooling fan flow of an engine fan, creating abrupt thermal profiles in the lower skin and the side skins, which may result in restrained thermal expansion and high thermal stresses, and may lead to undesirable effects such as distortion, buckling, and even fatigue.

In another known heat shield design, the side skins and the lower skin are not directly attached and edges of the side skins extend beyond edges of the lower skin, and gaps are formed between each lower skin edge and each side skin. Typically, seals or other types of air ingress restrictors are used to seal or plug the gaps. With such design, the seals or other types of air ingress restrictors may be exposed to extreme heat from the heated exhaust gas, and if the seals or other types of air ingress restrictors deteriorate or crack due to the heated exhaust gas, the heated exhaust gas, as well as cooling fan flow, may flow past the lower skin edges and into an internal cavity of the heat shield. Moreover, the edges of the side skins extending beyond the edges of the lower skin are exposed to the extreme heat from the heated exhaust gas and are also exposed to cooling fan flow, creating a large thermal gradient that may result in undesirable effects such as distortion, buckling, and even fatigue.

Accordingly, there is a need in the art for an improved heat shield design for a heat shield for an aircraft that does not constrain differential thermal expansion and that allows independent thermal expansion of side skins and a lower skin, that does not extend side skin edges of the heat shield beyond lower skin edges of the heat shield, that reduces distortion, buckling, and fatigue of the heat shield, and that provides advantages over known heat shield designs and methods of using the same.

SUMMARY

Example implementations of the present disclosure provide an improved heat shield for an aircraft and method of using the same. As discussed in the below detailed description, versions of the improved heat shield and method may provide significant advantages over known heat shields and methods.

In a version of the disclosure, there is provided a heat shield for an aircraft. The heat shield comprises a pair of side skins. Each side skin is formed of a heat resistant material and has a side skin edge.

The heat shield further comprises a lower skin formed of a heat resistant material and having lower skin edges. The lower skin edges extend an extended length past the side skin edges. The lower skin edges are separate from the side skin edges. A gap is formed between the side skin edges and the lower skin. The lower skin is configured to thermally expand without contacting the pair of side skins.

The heat shield further comprises a plurality of frame members attached to the lower skin. The heat shield further comprises an air ingress restrictor assembly associated with one of, the pair of side skins, or the lower skin. The air ingress restrictor assembly is configured to restrict air flow between the pair of side skins and the lower skin into the heat shield.

The extended length of the lower skin edges extending past the side skin edges, and the air ingress restrictor assembly, block flow of a heated exhaust gas, from a jet engine positioned forward of the heat shield, into an internal cavity of the heat shield. The lower skin edges being separate from the side skin edges reduces a risk of fatigue of the heat shield.

In another version of the disclosure, there is provided an aircraft. The aircraft comprises a fuselage, at least one wing attached to the fuselage, and two or more jet engines attached to the at least one wing. Each jet engine is configured to exhaust a heated exhaust gas, and each jet engine has a fan configured to exhaust a cooling fan flow air stream.

The aircraft further comprises a heat shield positioned adjacent to each jet engine. The heat shield comprises a pair of side skins. Each side skin is formed of a heat resistant material and has a side skin edge.

The heat shield further comprises a lower skin formed of a heat resistant material and having lower skin edges. The lower skin edges extend an extended length past the side skin edges. The lower skin edges are separate from the side skin edges. A gap is formed between the side skin edges and the lower skin. The lower skin is configured to thermally expand without contacting the pair of side skins.

The heat shield further comprises a plurality of frame members attached to the lower skin. The heat shield further comprises an air ingress restrictor assembly associated with one of, the pair of side skins, or the lower skin. The air ingress restrictor assembly is configured to restrict air flow between the pair of side skins and the lower skin into the heat shield.

The extended length of the lower skin edges extending past the side skin edges, and the air ingress restrictor assembly, block flow of the heated exhaust gas from each jet engine, into an internal cavity of the heat shield. The lower skin edges being separate from the side skin edges reduces a risk of fatigue of the heat shield.

In another version of the disclosure, there is provided a method of using a heat shield in an aircraft. The method comprises the step of providing the heat shield positioned adjacent to a jet engine of the aircraft.

The heat shield comprises a pair of side skins. Each side skin is formed of a heat resistant material and has a side skin edge. The heat shield further comprises a lower skin formed of a heat resistant material and having lower skin edges. The lower skin edges extend an extended length past the side skin edges. The lower skin edges are separate from the side skin edges. A gap is formed between the side skin edges and the lower skin.

The heat shield further comprises a plurality of frame members attached to the lower skin. The heat shield further comprises an air ingress restrictor assembly associated with one of, the pair of side skins, or the lower skin. The air ingress restrictor assembly is configured to restrict air flow between the pair of side skins and the lower skin into the heat shield.

The method further comprises the step of operating the jet engine of the aircraft. The method further comprises the step of thermally expanding the lower skin of the heat shield without the lower skin contacting the pair of side skins of the heat shield. The method further comprises the step of blocking flow of a heated exhaust gas from the jet engine, into an internal cavity of the heat shield, using the extended length of the lower skin edges extending past the side skin edges, and the air ingress restrictor assembly, and reducing a risk of fatigue of the heat shield with the lower skin edges being separate from the side skin edges.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or claims.

Figure 1:
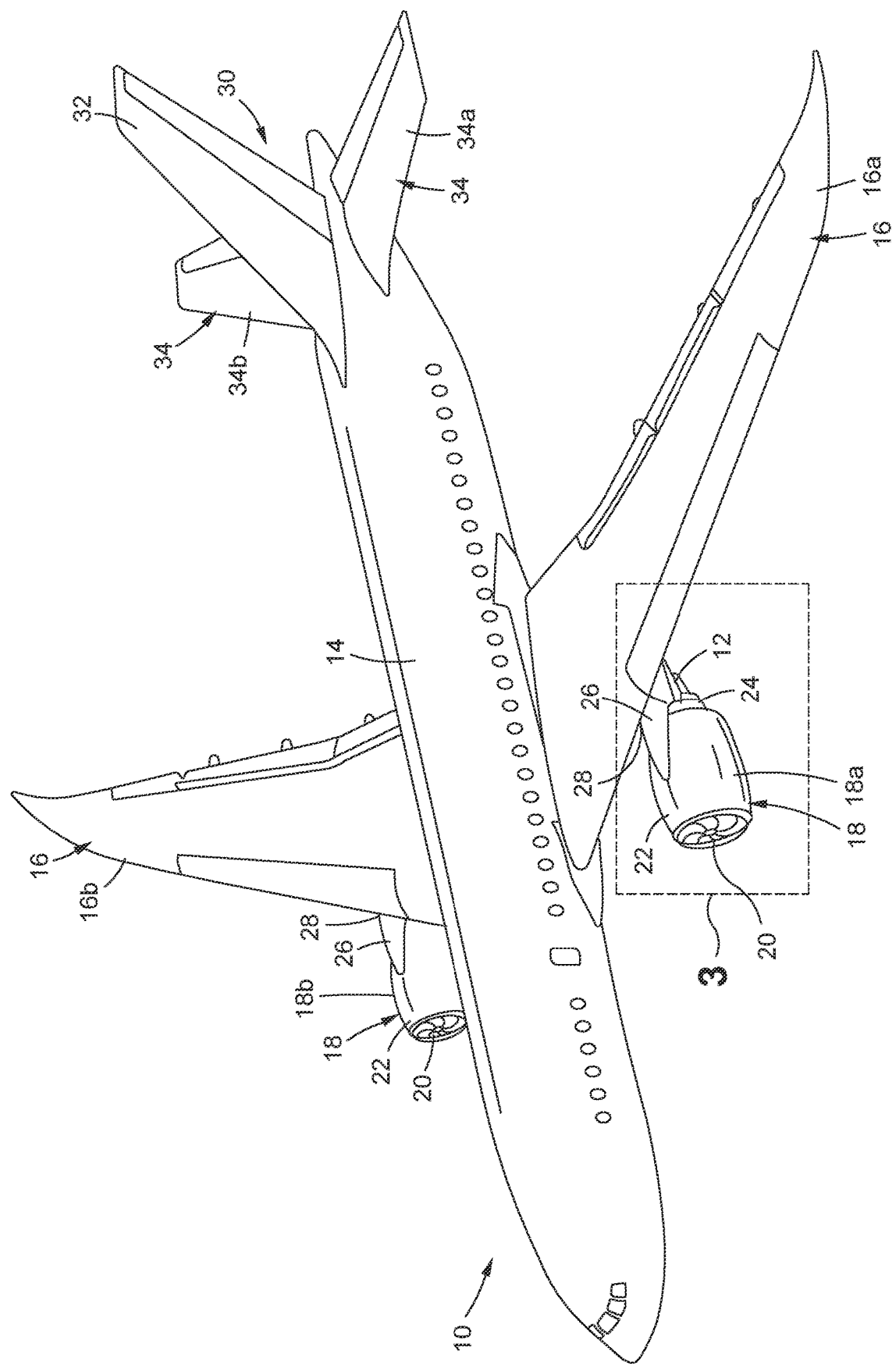
FIG. 1 is an illustration of a perspective view of an aircraft in which an exemplary version of a heat shield of the disclosure may be implemented.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "one version" or "a version" do not necessarily refer to the same version. Particular features, structures, or characteristics may be combined in any suitable manner consistent with this disclosure. All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Now referring to FIG. 1, FIG. 1 is an illustration of a perspective view of an aircraft 10 in which an exemplary version of a heat shield 12 of the disclosure may be implemented. The aircraft 10 is an example of an aircraft in which exemplary versions of the heat shield 12 may be implemented. The aircraft 10 may comprise an aircraft with jet engines 18 (see FIG. 1), for example a turbojet aircraft. The aircraft may also comprise aircraft with turboprop engines, turbofan engines, turboshaft engines, or other suitable types of engines. Other suitable aircraft, spacecraft, or other vehicles may also be used to implement exemplary versions of the heat shield 12 disclosed herein.

As shown in FIG. 1, the aircraft 10 has a fuselage 14, or body, and at least one wing 16 attached to the fuselage 14. FIG. 1 shows wings 16, including a first wing 16a and a second wing 16b, where each wing 16 is attached to a side of the fuselage 14 and extends away from the fuselage 14 opposite each other.

The aircraft 10 further comprises two or more jet engines 18 (see FIG. 1) attached to the at least one wing 16 or wings 16. FIG. 1 shows two jet engines 18, including a first jet engine 18a attached to the first wing 16a and a second jet engine 18b attached to the second wing 16b. As shown in FIG. 1, each jet engine 18 includes at least a fan 20, a nacelle 22 housing the fan 20, and an engine exhaust system 24 aft of the nacelle 22. Each jet engine 18 is attached to the underside of the wing 16, via a pylon 26, in an underwing configuration 28.

As shown in FIG. 1, the aircraft 10 further comprises a tail section 30 comprising a vertical stabilizer 32, and two horizontal stabilizers 34. The two horizontal stabilizers 34 comprise a first horizontal stabilizer 34a (see FIG. 1) and a second horizontal stabilizer 34b (see FIG. 2).

In one version, as shown in FIG. 1, the heat shield 12 is positioned behind the nacelle 22 of the jet engine 18, such as the first jet engine 18a, and the heat shield 12 is positioned adjacent to the jet engine 18, and in particular, is adjacent to the engine exhaust system 24 of the first jet engine 18a. A heat shield 12 is similarly positioned behind the nacelle 22 of the jet engine 18, such as the second jet engine 18b, and adjacent to the jet engine 18, and in particular, is adjacent to the engine nozzle of the second jet engine 18b. In another version, each heat shield 12 is positioned behind, or aft of, each jet engine 18, for example, extending behind, or aft of, the jet engine 18.

The heat shield 12 is positioned to shield a structure 36 (see FIGS. 2, 3), such as an upper structure 36a (see FIGS. 2, 3), for example, a strut aft fairing 38 (see FIGS. 2, 3) of an aft fairing assembly 35 (see FIG. 3), positioned above, or adjacent to, the heat shield 12, and block a flow 40a (see FIG. 2) of a heated exhaust gas 42 (see FIG. 2), also referred to as heat exhaust or engine exhaust plume, discharged or output from the jet engine 18 positioned forward of the heat shield 12. The aft fairing assembly 35 (see FIG. 3) may be attached to the wing 16 (see FIG. 1) and/or the pylon 26 (see FIG. 1). In one version, the heat shield 12 comprises a strut aft fairing heat shield 12a (see FIGS. 2, 5).

Figure 2:
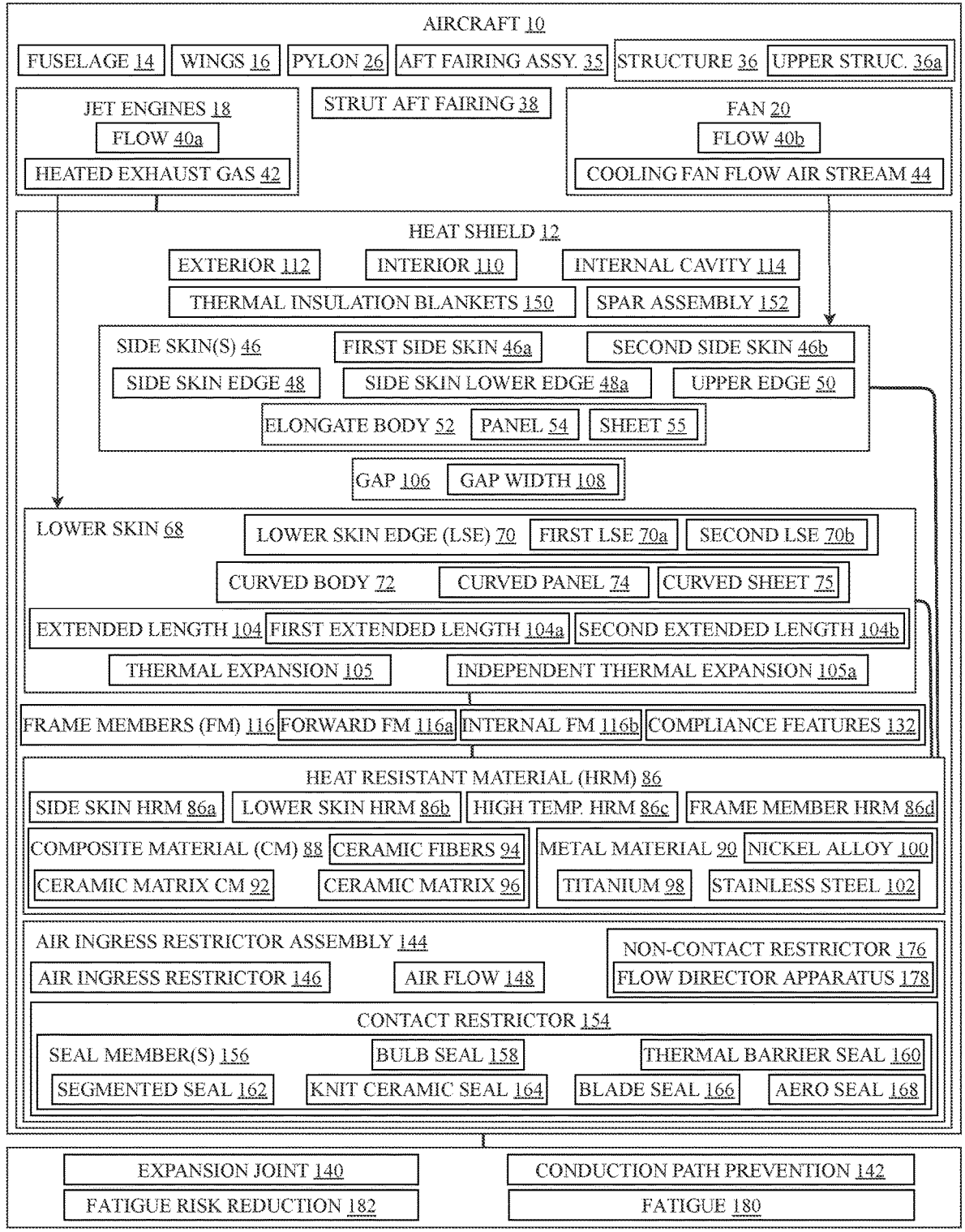
FIG. 2 is an illustration of a system block diagram of an aircraft in which exemplary versions of a heat shield operate in accordance with the disclosure.

Now referring to FIG. 2, FIG. 2 is an illustration of a system block diagram of an aircraft 10 in which exemplary versions of the heat shield 12 operate in accordance with the disclosure. The aircraft 10 of FIG. 1 may be a physical implementation of aircraft 10 of FIG. 2.

The blocks in FIG. 2 represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein. One or more of these blocks may be combined, divided, or combined and divided into different blocks when implemented in an illustrative example. Further, the illustrations of the heat shield 12 in FIG. 2 are not meant to imply physical or architectural limitations to the manner in which an illustrative example may be implemented. Other components in addition to, or in place of, the ones illustrated may be used. Some components may be unnecessary.

As shown in FIG. 2, the aircraft 10 comprises the fuselage 14, at least one wing 16, jet engines 18 coupled to the wing 16 in the underwing configuration 28 (see FIG. 1), the fan 20, the pylon 26, and the aft fairing assembly 35 with the strut aft fairing 38 positioned aft of each jet engine 18. As further shown in FIG. 2, the jet engines 18 discharge or output the flow 40a of the heated exhaust gas 42, or exhaust heat, and the fan 20 discharges or outputs a flow 40b of a cooling fan flow air stream 44. The heat shield 12 design disclosed herein prevents exposure of an internal cavity 114 (see FIGS. 2, 8) of the heat shield 12 to the heated exhaust gas 42 by drawing in the cooling fan flow air stream 44.

In one version of the disclosure, there is provided a heat shield 12 for an aircraft 10. As shown in FIG. 2, the aircraft 10 includes heat shields 12 positioned adjacent to the jet engines 18, or extending aft behind the heated exhaust gas 42. In one version, the aircraft 10 include two heat shields 12, one associated with each jet engine 18. Alternatively, the aircraft 10 may include more than two heat shields 12. In one version, each heat shield 12 is connected to the wing 16 through the strut aft fairing 38 and is configured to shield the strut aft fairing 38 from the heated exhaust gas 42. In one version, as shown in FIG. 2, the heat shield 12 comprises the strut aft fairing heat shield 12a.

Figure 5:
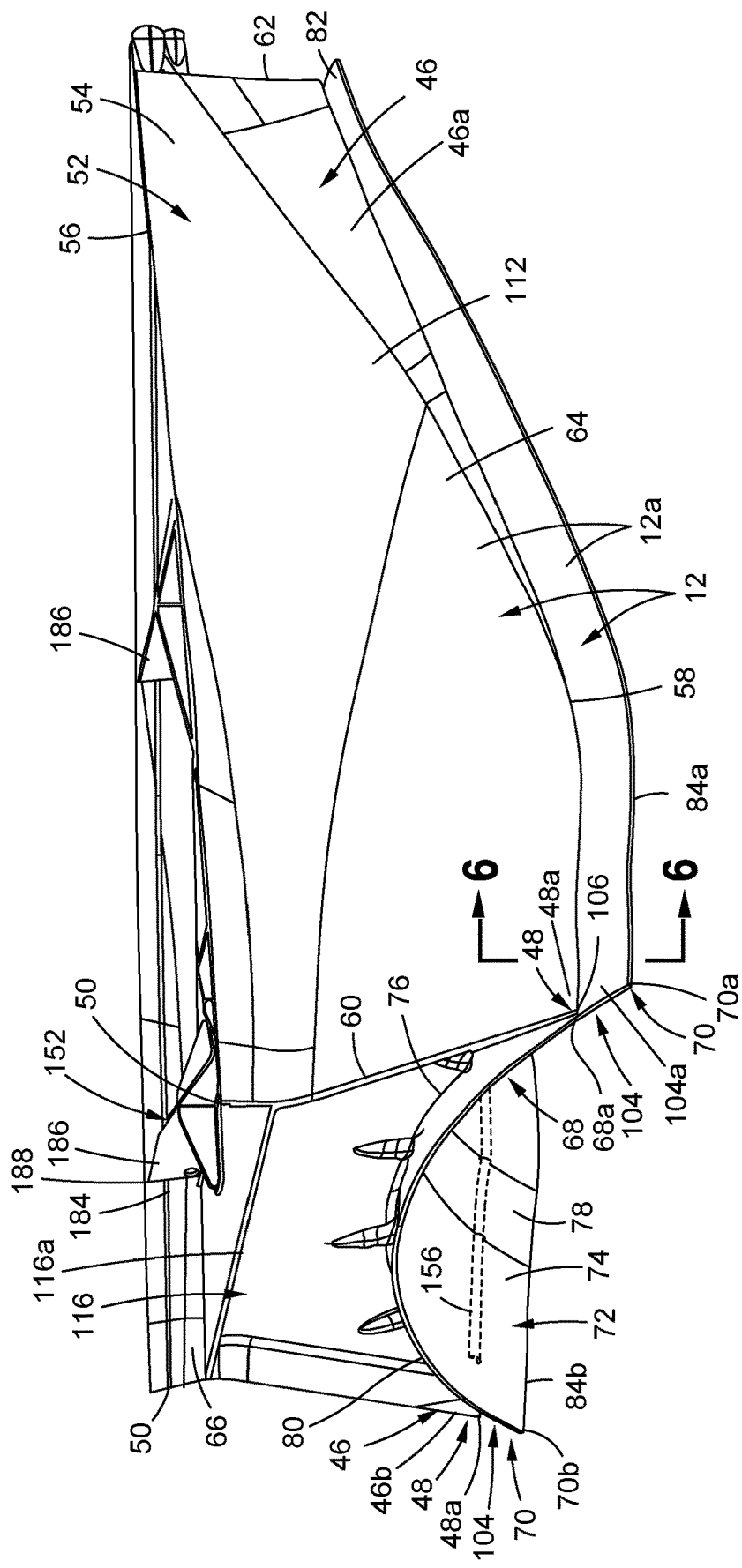
FIG. 5 is an illustration of a side perspective view of an exemplary version of a heat shield of the disclosure.

As shown in FIG. 2, in one version, the heat shield 12 for the aircraft 10 comprises a pair of side skins 46, or side skins 46. The pair of side skins 46, or two side skins 46, comprise a first side skin 46a (see FIG. 2) and a second side skin 46b (see FIG. 2). As shown in FIG. 2, each of the side skins 46, such as the first side skin 46a and the second side skin 46b, comprises a side skin edge 48, such as a side skin lower edge 48a. As further shown in FIG. 2, each of the side skins 46 comprises an upper edge 50. As further shown in FIG. 2, each of the side skins 46 comprises an elongate body 52, such as in the form of a panel 54, a sheet 55, or another suitable body structure. As shown in FIG. 5, the elongate body 52 has a top end 56, a bottom end 58, a forward side end 60, an aft side end 62, an outer side 64, and an inner side 66. FIG. 5 shows the side skin 46, such as the first side skin 46a, with the elongate body 52. However, in other versions, each side skin 46 may have a different configuration or shape.

As shown in FIG. 2, the heat shield 12 further comprises a lower skin 68. As shown in FIG. 2, the lower skin 68 comprises lower skin edges 70, such as a first lower skin edge 70a and a second lower skin edge 70b. As further shown in FIG. 2, the lower skin 68 has a curved body 72, such as in the form of a curved panel 74, a curved sheet 75, or another suitable body structure. As shown in FIG. 5, the curved body 72 has a top side 76, a bottom side 78, a forward end 80, an aft end 82, a first lower end 84a, and a second lower end 84b. FIG. 5 shows the lower skin 68 with the curved body 72. However, in other versions, the lower skin 68 may have a different configuration or shape.

Each side skin 46 is formed of a heat resistant material 86 (see FIG. 2), such as side skin heat resistant material 86a. The lower skin 68 is formed of a heat resistant material 86, such as a lower skin heat resistant material 86b (see FIG. 2). Preferably, the heat resistant material 86, such as the side skin heat resistant material 86a and the lower skin heat resistant material 86b is a high temperature heat resistant material 86c (see FIG. 2).

As used herein, "high temperature" means a temperature in a temperature range of from 500 degrees Fahrenheit (260 degrees Celsius) to 1500 degrees Fahrenheit (816 degrees Celsius). However, the temperature range may include temperatures higher than 1500 degrees Fahrenheit (816 degrees Celsius). The heat resistant material 86, such as the high temperature heat resistant material 86c, of the side skins 46 and the lower skin 68 is able to withstand temperatures in a temperature range of from 500 degrees Fahrenheit (260 degrees Celsius) to 1500 degrees Fahrenheit (816 degrees Celsius), or higher.

The heat resistant material 86 is selected to be inert to the heated exhaust gas 42 of the jet engine 18. The heat resistant material 86 is further selected to withstand the high temperatures of the jet engine 18, along with an acidic nature of the heated exhaust gas 42. In particular, the heat resistant material 86, such as the lower skin heat resistant material 86b, of the lower skin 68, is selected to be exposed to the heated exhaust gas 42, or exhaust heat, discharged or output by the jet engine 18 without undesirable effects, and is configured to resist the heated exhaust gas 42. Further, the heat resistant material 86, such as the side skin heat resistant material 86a, of the side skin 46, is configured to resist the heated exhaust gas 42, or exhaust heat, discharged or output by the jet engine 18. Temperatures experienced by the side skins 46 are less than temperatures experienced by the lower skin 68. The side skins 46 are exposed to cooling fan flow air stream 44.

In one version, the heat resistant material 86 of the side skins 46, such as the side skin heat resistant material 86a, and the heat resistant material 86 of the lower skin 68, such as the lower skin heat resistant material 86b, are the same heat resistant material 86. In another version, the heat resistant material 86 of the side skins 46, such as the side skin heat resistant material 86a, and the heat resistant material 86 of the lower skin 68, such as the lower skin heat resistant material 86b, are different heat resistant materials 86.

As shown in FIG. 2, the heat resistant material 86 comprises a composite material 88, a metal material 90, or another suitable material. As further shown in FIG. 2, the composite material 88 comprises a ceramic matrix composite material 92, or a composite material 88 including at least one of ceramic fibers 94, or a ceramic matrix 96. Preferably, the ceramic matrix composite material 92 is a high temperature heat resistant ceramic matrix composite material. In other versions, the composite material 88 comprises other suitable high temperature heat resistant composite materials that are able to withstand temperatures in a temperature range of from 500 degrees Fahrenheit (260 degrees Celsius) to 1500 degrees Fahrenheit (816 degrees Celsius), or higher. As shown in FIG. 2, the metal material 90 may comprise titanium 98, nickel alloy 100, stainless steel 102, or another suitable metal material. Preferably, the titanium 98 is a high temperature heat resistant titanium. In other versions, the metal material 90 comprises other suitable high temperature heat resistant metal materials that are able to withstand temperatures in a temperature range of from 500 degrees Fahrenheit (260 degrees Celsius) to 1500 degrees Fahrenheit (816 degrees Celsius), or higher. In other versions, the heat resistant material 86 may comprise another type of material recognized by one skilled in the art as being a suitable material for the side skins 46 and the lower skin 68 of the heat shield 12.

Each of the lower skin edges 70, such as the first lower skin edge 70a and the second lower skin edge 70b, of the lower skin 68, extends an extended length 104 (see FIGS. 2, 6) of the lower skin 68, past each of the side skin edges 48, such as the side skin lower edges 48a, of the side skins 46, such as the first side skin 46a and the second side skin 46b. The extended lengths 104 of the lower skin 68 comprise a first extended length 104a (see FIGS. 2, 5) of the first lower skin edge 70a (see FIG. 2), and a second extended length 104b (see FIGS. 2, 5) of the second lower skin edge 70b. Each lower skin edge 70 extends past each side skin edge 48 an extended length 104 in a range of from 1.0 inch (2.54 centimeters) to 6.0 inches (15.24 centimeters). However, another suitable extended length may be used, depending on the size of the lower skin 68 and the size of the side skins 46 of the heat shield 12, and also depending on the size of the jet engines 18 and the aircraft 10. The lower skin 68 overlaps the side skins 46, to shield the side skins 46 from the heated exhaust gas 42.

The lower skin edges 70 are separate from the side skin edges 48, and the lower skin 68 is not directly attached to the side skins 46. The lower skin 68 and the side skins 46 may be indirectly attached but are not directly attached. The lower skin 68 is configured to thermally expand, and to undergo a thermal expansion 105 (see FIG. 2), without contacting the side skins 46. To accommodate the thermal expansion 105 of the lower skin 68, the side skin edges 48 are not attached to the lower skin edges 70, and the side skins 46 are not directly attached, or connected, to the lower skin 68. The lower skin 68 is configured to be exposed to the heated exhaust gas 42 (see FIGS. 3, 4) discharged or output from the jet engine 18 (see FIGS. 1, 3, 4). Each of the side skins 46 is configured to be exposed to the cooling fan flow air stream 44 discharged or output from the fan 20 (see FIG. 1). Separating the lower skin 68, including the lower skin edges 70, from the side skins 46, including the side skin edges 48, allows for independent thermal expansion 105a (see FIG. 2) of the lower skin 68 and the side skins 46. Further, no direct attachment of each side skin 46 to the lower skin 68 allows for free expansion of a hot lower portion of the heat shield 12.

A gap 106 (see FIG. 2) is formed, or is present, between the side skin edges 48, such as each side skin edge 48, and the lower skin 68, such as at a lower skin portion 68a (see FIG. 6) at a point above each lower skin edge 70. The gap 106 preferably has a gap width 108 (see FIG. 2) in a range of from 0.1 inch (0.254 centimeters) to 0.25 inch (0.635 centimeters). However, the gap 106 may have another suitable gap width, such as greater than 0.25 inch.

Figure 3:
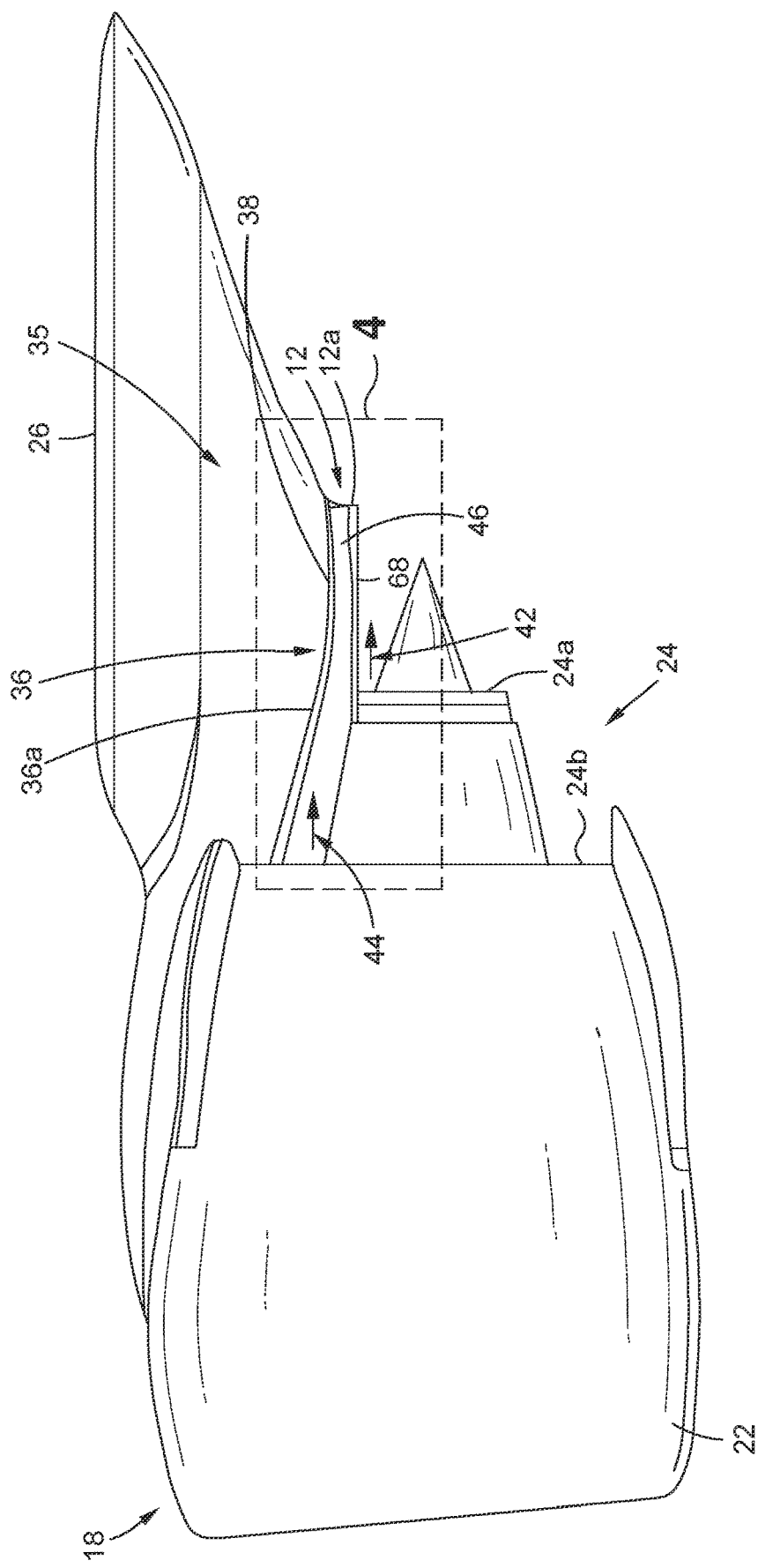
FIG. 3 is an illustration of an enlarged side view of a jet engine and the heat shield within the box labeled 3 in FIG. 1, in accordance with an illustrative example.

The lower skin edge 70 of the lower skin 68 extending the extended length 104 past the side skin edge 48 shields the side skin 46 and the gap 106 from the heated exhaust gas 42 (see FIGS. 2, 3, 4) discharged or output from the jet engine 18 (see FIGS. 1-3).

As shown in FIG. 2, the heat shield 12 further comprises an interior 110, an exterior 112, and an internal cavity 114 in the interior 110 of the heat shield. The internal cavity 114 of the heat shield 12 houses a plurality of frame members 116, one or more thermal blankets, or other structures, or insulation assemblies.

Figure 8:
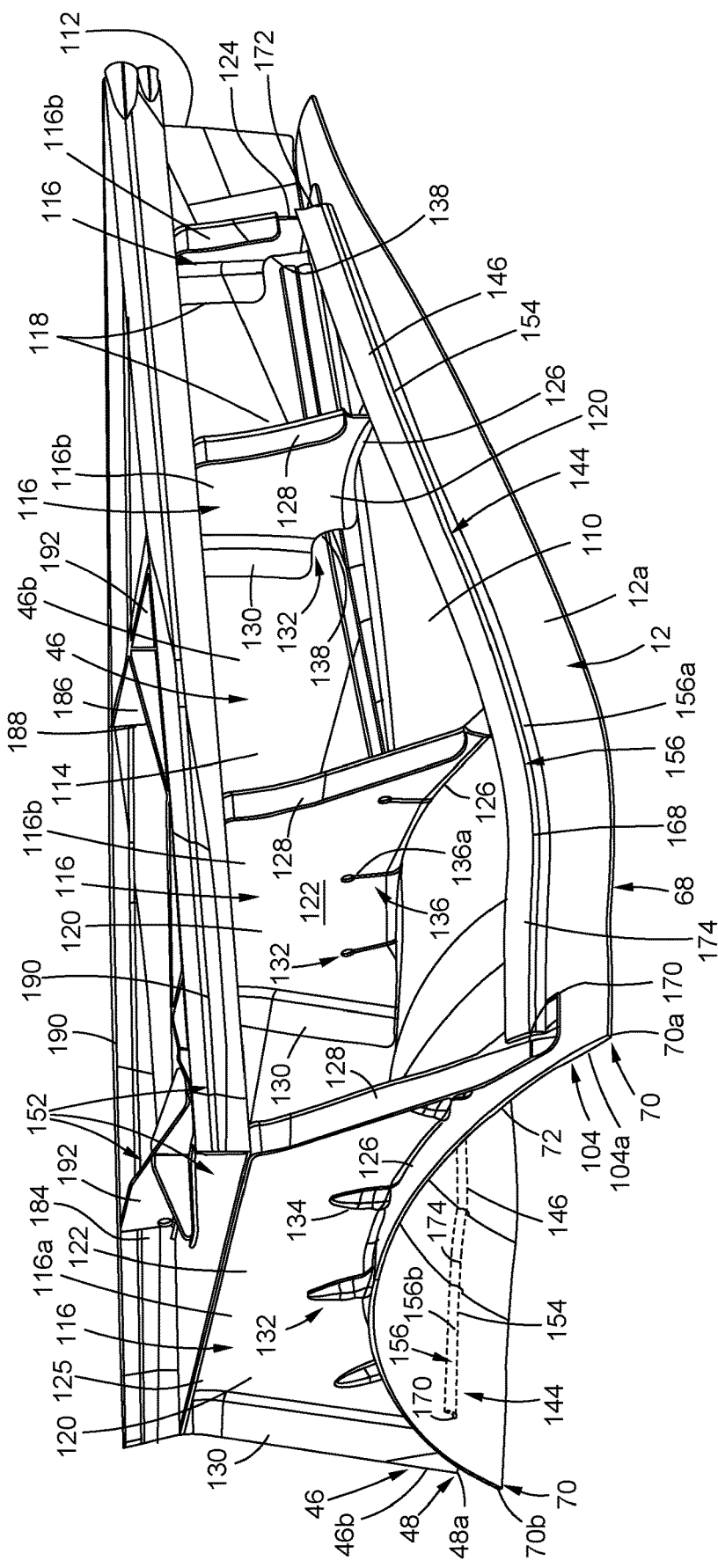
FIG. 8 is an illustration of a side perspective view of the heat shield of FIG. 5 with a side skin removed.

As shown in FIG. 2, the plurality of frame members 116 comprise a forward frame member 116a and internal frame members 116b positioned aft of the forward frame member 116a. The internal frame members 116b are positioned in the internal cavity 114 in the interior 110 of the heat shield 12. The internal frame members 116b are not exposed to external air flow. The plurality of frames members 116 are fastened, or attached, to the lower skin 68 in a spaced apart arrangement 118 (see FIG. 8) and provide support to the heat shield 12. As shown in FIG. 8, each frame member 116 comprises a frame body 120 having a generally trapezoid shape. As further shown in FIG. 8, each frame body has a forward face 122, an aft face 124, a top end 125, a bottom end 126 that is curved to correspond to the curved body 72 of the lower skin 68, a first side 128, and a second side 130.

The plurality of frame members 116 may comprise one or more compliance features 132 (see FIG. 2) configured to accommodate thermal expansion 105 (see FIG. 2) of the lower skin 68. One or more compliance features 132 may be formed in only the forward frame member 116a, one or more compliance features 132 may be formed in only the internal frame members 116b, or compliance features 132 may be formed in both the forward frame member 116a and the internal frame members 116b.

The one or more compliance features 132 of the forward frame member 116a include one or more recessed arch portions 134 (see FIG. 8). As shown in FIG. 8, the recessed arch portions 134 are formed in the frame body 120 and spaced along the bottom end 126 of the frame body 120 of the forward frame member 116a. The forward frame member 116a may also have another suitable compliance feature. The one or more compliance features 132, such as the one or more recessed arch portions 134, formed in the frame body 120 of the forward frame member 116a does not allow entry of external air flow into the interior 110 of the heat shield 12. FIG. 8 shows the compliance feature 132 comprising the recessed arch portions 134 in the forward frame member 116a. However, in other versions, the forward frame member 116a may have compliance features having a different configuration or shape.

The internal frame members 116b are designed with the compliance features 132 to minimize longitudinal and transverse thermal expansion constraints on the lower skin 68. The compliance features 132 of the internal frame members 116b may include slots 136 (see FIG. 8), such as keyhole slots 136a (see FIG. 8), formed in and through the frame body 120 of the internal frame member 116b. As shown in FIG. 8, the slots 136 are vertically spaced along the bottom end 126 of the frame body 120 of the internal frame members 116b. One or more slots 136 may be present in one or more of the internal frame members 116b. When the lower skin 68 thermally expands, the slots 136 open transversely to accommodate transverse expansion of the lower skin 68. The slots 136 may also transversely expand to allow the lower skin 68 to bend in the fore/aft direction. FIG. 8 shows the compliance feature 132 comprising the slots 136, such as the keyhole slots 136a, in one or more of the internal frame members 116b. However, in other versions, the internal frame members 116b may have compliance features having a different configuration or shape.

The compliance features 132 of the internal frame members 116b may further include lower rounded corners 138 (see FIG. 8) formed in one or more internal frame members 116b. As shown in FIG. 8, the lower rounded corners 138 are set apart from the lower skin 68 and the side skins 46, and are formed between the first side 128 and the bottom end 126, and the second side 130 and the bottom end 126 of the frame body 120 of the internal frame member 116b. In some illustrative examples, the rounded corners 138 change in size through the length of the heat shield 12. In some illustrative examples, the rounded corners 138 increase in size moving in an aft direction in the heat shield 12. FIG. 8 shows the compliance feature 132 comprising the rounded corners 138 in one or more of the internal frame members 116b. However, in other versions, the internal frame members 116b may have compliance features having a different configuration or shape.

The plurality of frame members 116 are also a heat resistant material 86, such as a frame member heat resistant material 86d (see FIG. 2), that is preferably configured to withstand temperatures in a temperature range of from 500 degrees Fahrenheit (260 degrees Celsius) to 1500 degrees Fahrenheit (816 degrees Celsius), or higher. The frame member heat resistant material 86d and the side skin heat resistant material 86a may be the same heat resistant material 86 or different heat resistant materials 86. The frame member heat resistant material 86d and the lower skin heat resistant material 86b may be the same heat resistant material 86 or different heat resistant materials 86. In some illustrative examples, the plurality of frame members 116 are formed of a metal material 90 (see FIG. 2), such as titanium 98, nickel alloy 100, stainless steel 102, or another suitable metal material, to accommodate thermal expansion 105 of the lower skin 68 and to accommodate strains. In some illustrative examples, the plurality of frame members 116 are formed of a metal material 90, and the lower skin 68 and the side skins 46 are formed of one or more composite materials 88 (see FIG. 2).

An expansion joint 140 (see FIG. 2) is created through the plurality of frame members 116, by separating the pair of side skins 46 and the lower skin 68 and preventing a direct structural attachment, or direct structural bond, between the pair of side skins 46 and the lower skin 68. Further, having the gap 106 between the pair of side skins 46 and the lower skin 68 prevents formation of a conduction path between the pair of side skins 46 and the lower skin 68, to obtain a decrease or reduced heating of the pair of side skins 46. Preventing the conduction path helps to reduce the temperature on the side skin edges 48, such as the side skin lower edges 48a, and allows more materials to be viable for the side skins 46, since the temperature environment is less severe when the conduction path is removed. The heat shield 12 with the design of the gap 106 present between the side skins 46 and the lower skin 68, and the lower skin 68 having the extended length 104 extending beyond the side skin edges 48 of the side skins 46, allows for a conduction path prevention 142 (see FIG. 2).

As further shown in FIG. 2, the heat shield 12 further comprises an air ingress restrictor assembly 144 associated with, such as coupled to, one of, the pair of side skins 46, or the lower skin 68. The air ingress restrictor assembly 144 comprises an air ingress restrictor 146 (see FIG. 2) configured to restrict air flow 148 (see FIG. 2) into the interior 110 of the heat shield 12 from gaps or openings, such as the gap 106 (see FIG. 6), between the pair of side skins 46 and the lower skin 68. The air flow 148 into the interior 267 of the heat shield 12 may undesirably affect components in the interior 110 of heat shield 208. For example, air flow 148 into the interior 110 of the heat shield 12 may undesirably affect thermal insulation blankets 150 (see FIG. 2) located in the interior 110 of the heat shield 12. The thermal insulation blankets 150 typically are present to insulate or protect a spar assembly 152 (see FIGS. 2, 8) and other structures of the aircraft 10 located above the heat shield 12 from the high temperatures of the heated exhaust gas 42. High speed air ingression may undesirably affect the thermal insulation blankets 150.

In one version, as shown in FIG. 2, the air ingress restrictor 146 comprises a contact restrictor 154. The air ingress restrictor 146 in the form of the contact restrictor 154 restricts air flow 148 between a side skin 46 and the lower skin 68 by contacting the side skin 46 and the lower skin 68. By contacting the side skin 46 and the lower skin 68, the air ingress restrictor 146 physically blocks the air flow 148 into the heat shield 12.

As shown in FIG. 2, in one version, the contact restrictor 154 comprises one or more seal members 156 configured to block air ingression into the internal cavity 114 of the heat shield 12. As shown in FIG. 2, the one or more seal members 156 comprise one of, a bulb seal 158, a thermal barrier seal 160, a segmented seal 162, a knit ceramic seal 164, a blade seal 166, an aero seal 168, or another suitable seal member. Preferably, the seal member 156 comprises the aero seal 168, such as a high temperature aero seal, to block the air flow 148 into the internal cavity 114 of the heat shield 12, and to block air ingression into the internal cavity 114 of the heat shield 12. As shown in FIG. 8, the heat shield 12 has two seal members 156, including a first seal member 156a and a second seal member 156b. As further shown in FIG. 8, each seal member 156 has a forward end 170, an aft end 172, and an elongate body 174 formed between the forward end 170 and the aft end 172. The seal member 156 is preferably formed of a material configured to withstand temperatures encountered by the heat shield 208. For example, the seal members 156 may be formed of one or more high temperature heat resistant materials.

In another version, as shown in FIG. 2, the air ingress restrictor assembly 144 comprises the air ingress restrictor 146 comprising a non-contact restrictor 176. The air ingress restrictor 146 in the form of the non-contact restrictor 176 restricts the air flow 148 between the side skin 46 and the lower skin 68, without contacting both the lower skin 68 and the pair of side skins 46. As shown in FIG. 2, in one version, the non-contact restrictor 176 comprises a flow director apparatus 178. The flow director apparatus 178 is configured to redirect the air flow 148 entering the heat shield 12, such as through gaps or openings, between each side skin 46 and the lower skin 68. In some illustrative examples, the flow director apparatus 178 restricts air flow 148 by presenting a tortuous path to the air flow 148.

Thus, the air ingress restrictor assembly 144 blocks or restricts the air flow 148 into the internal cavity 114 of the heat shield 12. Further, the air ingress restrictor assembly 144 block or restrict the flow 40a (see FIG. 2) of the heated exhaust gas 42, from each jet engine 18 positioned forward of the heat shield 12, into the internal cavity 114 (see FIGS. 2, 8) of the heat shield 12, to reduce heating of structures 36 (see FIG. 2), such as upper structures 36a (see FIG. 2), above or adjacent to the heat shield 12, for example, the strut aft fairing 38 (see FIG. 2). Further, the air ingress restrictor assembly 144 blocks or restricts the flow 40b (see FIG. 2) of the cooling fan flow air stream 44 (see FIG. 2) from the fan 20 (see FIGS. 1, 2), into the internal cavity 114 (see FIGS. 2, 8) of the heat shield 12. Further, the lower skin edges 70 and the lower skin 68 being separate from the side skin edges 48 and the side skins 46 reduces a risk of fatigue 180 (see FIG. 2) of the heat shield 12, to provide a fatigue risk reduction 182 (see FIG. 2). As used herein, "fatigue" means weakness in materials, especially metal, caused by repeated variations of stress, where fatigue may include cracking.

In another version, as disclosed herein, there is provided an aircraft 10 (see FIGS. 1, 2). The aircraft 10 comprises the fuselage 14 (see FIG. 1), at least one wing 16 (see FIG. 1) attached to the fuselage 14, and two or more jet engines 18 (see FIG. 1) attached to the at least one wing 16. Each jet engine 18 is configured to exhaust a heated exhaust gas 42 (see FIG. 2), and each jet engine 18 has a fan 20 (see FIG. 1) configured to exhaust a cooling fan flow air stream 44 (see FIG. 2).

The aircraft 10 further comprises a heat shield 12 (see FIG. 2) positioned adjacent to each jet engine 18. The heat shield 12 comprises the pair of side skins 46 (see FIG. 2).

Each side skin 46 is formed of the heat resistant material 86 (see FIG. 2) and has the side skin edge 48 (see FIG. 2). The heat shield 12 further comprises the lower skin 68 (see FIG. 2) formed of the heat resistant material 86 and having lower skin edges 70 (see FIG. 2). The lower skin edges 70 extend the extended length 104 (see FIGS. 2, 6) past the side skin edges 48. The lower skin edges 70 are separate from the side skin edges 48. The gap 106 (see FIGS. 2, 6) is formed, or is present, between the side skin edges 48 and the lower skin 68. The lower skin 68 is configured to thermally expand without contacting the pair of side skins 46.

The heat shield 12 further comprises the plurality of frame members 116 (see FIGS. 2, 8) attached to the lower skin 68. The heat shield 12 further comprises the air ingress restrictor assembly 144 (see FIGS. 2, 8) associated with one of, the pair of side skins 46, or the lower skin 68. The air ingress restrictor assembly 144 is configured to restrict air flow 148 (see FIG. 2) between the pair of side skins 46 and the lower skin 68 into the heat shield 12

The extended length 104 of the lower skin edges 70 extending past the side skin edges 48, and the air ingress restrictor assembly 144, block flow 40a of the heated exhaust gas 42 from each jet engine 18, into an internal cavity 114 of the heat shield 12, and further wherein, the lower skin edges 70 being separate from the side skin edges 48 reduces a risk of fatigue 180 (see FIG. 2) of the heat shield 12.

The aircraft 10 may further comprises the strut aft fairing 38 (see FIGS. 2, 3) positioned adjacent to the heat shield 12. The heat resistant material 86 of the pair of side skins 46 and the heat resistant material 86 of the lower skin 68 each comprises one of, the composite material 88 (see FIG. 2), the metal material 90 (see FIG. 2), or another suitable material. In one version, the air ingress restrictor assembly 144 (see FIGS. 2, 8) comprises one or more seal members 156 (see FIGS. 2, 8). As shown in FIG. 2, each seal member 156 comprises one of, a bulb seal 158, a thermal barrier seal 160, a segmented seal 162, a knit ceramic seal 164, a blade seal 166, or an aero seal 168. In another version, the air ingress restrictor assembly 144 (see FIG. 2) comprises the flow director apparatus 178 (see FIG. 2) configured to redirect the air flow 148 entering the heat shield 12 between each side skin 46 and the lower skin 68.

Now referring to FIG. 3, FIG. 3 is an illustration of an enlarged side view of a jet engine 18 and the heat shield 12 within the box labeled 3 in FIG. 1, in accordance with an illustrative example. As shown in FIG. 3, in one version, the heat shield 12 comprises the strut aft fairing heat shield 12a. The heat shield 12 is a physical implementation of heat shield 12 of FIG. 2. However, the heat shield 12 may comprise another suitable heat shield 12, as disclosed herein. As shown in FIG. 3, the heat shield 12 is positioned behind, or aft, of the nacelle 22 of the jet engine 18, and is adjacent to the jet engine 18, and in particular, the engine exhaust system 24 of the jet engine 18. FIG. 3 furthers shows a primary exhaust nozzle portion 24a, such as a primary hot exhaust nozzle portion, of the engine exhaust system 24. FIG. 3 further shows a secondary exhaust nozzle portion 24b, such as a secondary fan exhaust nozzle portion, of the engine exhaust system 24. FIG. 3 further shows a heated exhaust gas 42 discharged or output from the jet engine 18, via the engine exhaust system 24. FIG. 3 further shows the cooling fan flow air stream 44 discharged or output from the secondary exhaust nozzle portion 24b. The heat shield 12 is positioned downstream of the heated exhaust gas 42 and is positioned downstream of the cooling fan flow air stream 44. The heat shield 12 is exposed to the heated exhaust gas 42 and the cooling fan flow air stream 44. As shown in FIG. 3, the heat shield 12 is configured to shield, and shields, the structure 36, such as the upper structure 36a, for example, the strut aft fairing 38 of the aft fairing assembly 35, positioned above, or adjacent to, the heat shield 12, from the heated exhaust gas 42 of the jet engine 18.

Figure 4:
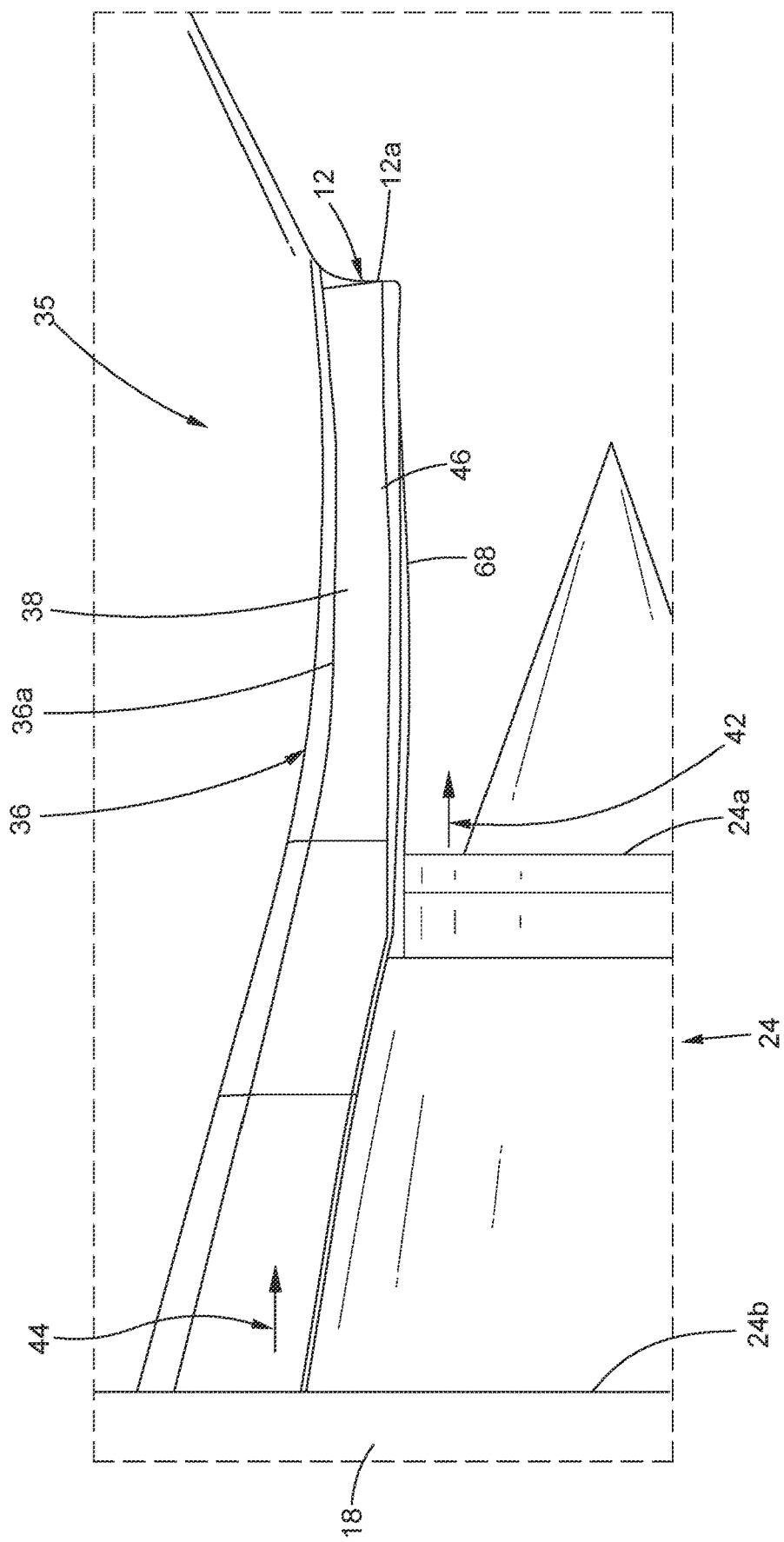
FIG. 4 is an illustration of an enlarged side view of the heat shield and an engine nozzle portion within the box labeled 4 in FIG. 3.

Now referring to FIG. 4, FIG. 4 is an illustration of an enlarged side view of the heat shield 12 and the primary exhaust nozzle portion 24a and the secondary exhaust nozzle portion 24b of the engine exhaust system 24 of the jet engine 18 within the box labeled 4 in FIG. 3. As shown in FIG. 4, the heat shield 12 is in the form of a strut aft fairing heat shield 12a. FIG. 4 shows the side skin 46 and the lower skin 68 of the heat shield 12. The side skin 46 of the heat shield 12 is designed to encounter the cooling fan flow air stream 44 from the fan 20 (see FIG. 1). The lower skin 68 of the heat shield 12 is exposed to the heated exhaust gas 42 discharged or output from the jet engine 18, via the engine exhaust system 24. As shown in FIG. 4, the heat shield 12 is configured to shield, and shields, the structure 36, such as the upper structure 36a, for example, the strut aft fairing 38, of the aft fairing assembly 35, positioned above, or adjacent to, the heat shield 12, from the heated exhaust gas 42 of the jet engine 18.

Now referring to FIG. 5, FIG. 5 is an illustration of a side perspective view of an exemplary version of the heat shield 12 of the disclosure. The heat shield 12 may be implemented in the aircraft 10 of FIG. 1, or another suitable aircraft, spacecraft, or vehicle. The heat shield 12 is one physical implementation of the heat shield 12 of FIG. 2. However, the heat shield 12 may 12 may comprise another suitable heat shield 12, as disclosed herein. As shown in FIG. 5, the heat shield 12 is in the form of a strut aft fairing heat shield 12a.

As shown in FIG. 5, the heat shield 12 comprises the pair of the side skins 46, or two side skins 46, such as the first side skin 46a and the second side skin 46b. As shown in FIG. 5, each side skin 46 has the side skin edge 48, such as the side skin lower edge 48a, and each side skin 46 has the upper edge 50. As shown in FIG. 5, each side skin 46 further comprises the elongate body 52, such as in the form of a panel 54. The elongate body 52 may also be in the form of a sheet 55 (see FIG. 2), or another suitable body structure. As shown in FIG. 5, the elongated body 52 has the top end 56, the bottom end 58, the forward side end 60, the aft side end 62, the outer side 64, and the inner side 66. Each side skin 46 is formed of the heat resistant material 86 (see FIG. 2), such as a high temperature heat resistant material 86c (see FIG. 2).

FIG. 5 further shows the lower skin 68. As shown in FIG. 5, the lower skin 68 comprises the lower skin edges 70, such as the first lower skin edge 70a and the second lower skin edge 70b. As shown in FIG. 5, the lower skin edge 70, such as the first lower skin edge 70a, of the lower skin 68, extends the extended length 104 past the side skin edge 48, such as the side skin lower edge 48a, of the side skin 46, such as the first side skin 46a. As further shown in FIG. 5, the lower skin 68 has the curved body 72, such as in the form of the curved panel 74. The curved body 72 may also be in the form of a curved sheet 75 (see FIG. 2), or another suitable body structure. As shown in FIG. 5, the curved body 72 has the top side 76, the bottom side 78, the forward end 80, the aft end 82, the first lower end 84a, and the second lower end 84b. The lower skin 68 is formed of the heat resistant material 86 (see FIG. 2), such as the high temperature heat resistant material 86c (see FIG. 2). The lower skin 68 is configured to thermally expand without contacting the side skins 46.

FIG. 5 furthers shows the seal member 156 coupled to, or contacting, the top side 76 of the lower skin 68.

As discussed above, the heat resistant material 86 of the side skins 46 and the heat resistant material 86 of the lower skin 68 are each comprised of one of, the composite material 88 (see FIG. 2), or the metal material 90 (see FIG. 2), or another suitable material. The composite material 88 may comprise the ceramic matrix composite material 92 (see FIG. 2), or another suitable composite material. The metal material 90 may comprise titanium 98 (see FIG. 2), nickel alloy 100 (see FIG. 2), stainless steel 102 (see FIG. 2), or another suitable metal material. The heat resistant material 86 may further comprise another type of material recognized by one skilled in the art as being a suitable material for the side skins 46 and the lower skin 68 of the heat shield 12. In one version, the heat resistant material 86 of the pair of side skins 46, such as the side skin heat resistant material 86a, and the heat resistant material 86 of the lower skin 68, such as the lower skin heat resistant material 86b, are the same heat resistant material 86. In another version, the heat resistant material 86 of the pair of side skins 46, such as the side skin heat resistant material 86a, and the heat resistant material 86 of the lower skin 68, such as the lower skin heat resistant material 86b, are different heat resistant materials 86.

As shown in FIG. 5, the lower skin edge 70, such as the first lower skin edge 70a, of the lower skin 68 extends the extended length 104 past the side skin edge 48 of the side skin 46, such as the first side skin 46a. Each lower skin edge 70 extends past each side skin edge 48 the extended length 104 in a range of from 1.0 inch (2.54 centimeters) to 6.0 inches (15.24 centimeters). However, another suitable extended length may be used. FIG. 5 shows the extended lengths 104 of the lower skin 68 comprising the first extended length 104a of the first lower skin edge 70a of the lower skin 68, and the second extended length 104b of the second lower skin edge 70b of the lower skin 68.

The lower skin edges 70 are separate from, and not directly attached to, the side skin edges 48, and the gap 106 (see FIG. 5) is formed between each side skin edge 48 and the lower skin portion 68a (see FIG. 5), or another lower skin portion, positioned at a point on the extended length 104 of the lower skin 68 above the lower skin edges 70. The gap 106 preferably has the gap width 108 (see FIG. 2) in a range of from 0.1 inch (0.254 centimeters) to 0.25 inch (0.635 centimeters). However, the gap 106 may have another suitable gap width. The lower skin 68 and lower skin edge 70 extending the extended length 104 past the side skin edge 48 shield the side skin 46 and the gap 106 from the heated exhaust gas 42 (see FIGS. 3, 4) discharged or output from the jet engine 18 (see FIGS. 1, 3, 4). Further, the extended length 104 of the lower skin edges 70 and the lower skin 68 extending past the side skin edges 48 of the side skins 46, blocks flow 40a (see FIG. 2) of the heated exhaust gas 42, or exhaust heat, from each jet engine 18 (see FIG. 1). Further, the lower skin edges 70 and the lower skin 68 being separate from the side skin edges 48 and the side skins 46 reduces the risk of fatigue 180 (see FIG. 2) of the heat shield 12, to provide the fatigue risk reduction 182 (see FIG. 2).

The lower skin 68 is configured to be exposed to the heated exhaust gas 42 (see FIGS. 3, 4) discharged or output from the jet engine 18 (see FIGS. 1, 3, 4). Each of the side skins 46 is configured to be exposed to the cooling fan flow air stream 44 (see FIGS. 2, 3, 4) discharged or output from the fan 20 (see FIG. 1). The lower skin 68 and the side skins 46 may be indirectly attached but are not directly attached.

Separating the lower skin 68, including the lower skin edges 70, from the side skins 46, including the side skin edges 48, allows for independent thermal expansion 105a (see FIG. 5) of the lower skin 68 and the side skins 46. Further, no direct attachment of each side skin 46 to the lower skin 68 allows for free expansion of a hot lower portion of the heat shield 12.

As shown in FIG. 5, the heat shield 12 further comprises the exterior 112 of the heat shield 12, and the plurality of frame members 116 attached, or fastened, to the lower skin 68. FIG. 5 shows the forward frame member 116a of the plurality of frame members 116.

As shown in FIG. 5, the spar assembly 152 is attached to the heat shield 12, and in particular, the spar assembly 152 is attached to inner portions 184 of the side skins 46 of the heat shield 12 and is positioned between the side skins 46. The spar assembly 152 comprises a plurality of spars 186 (see FIG. 5), or beams or other suitable support structures, positioned and attached between the side skins 46 of the heat shield 12. The spar assembly 152 functions as an interface 188 between the heat shield 12 and the structure 36 (see FIG. 3), such as the upper structure 36a (see FIG. 3), for example, the strut aft fairing 38 (see FIG. 3) of the aft fairing assembly 35 (see FIG. 3), positioned above, or in adjacent to, the heat shield 12. The structure 36, such as the upper structure 36a, is a cooler temperature than components of the heat shield 12, and is a cooler temperature than the lower skin 68. In some illustrative examples, the spar assembly 152 is formed of a material, such as a metal material or a composite material with a lower heat resistance than the heat resistant materials 86 (see FIG. 2), such as the high temperature heat resistant materials 86c (see FIG. 2), of the side skins 46, and the lower skin 68.

Figure 6:
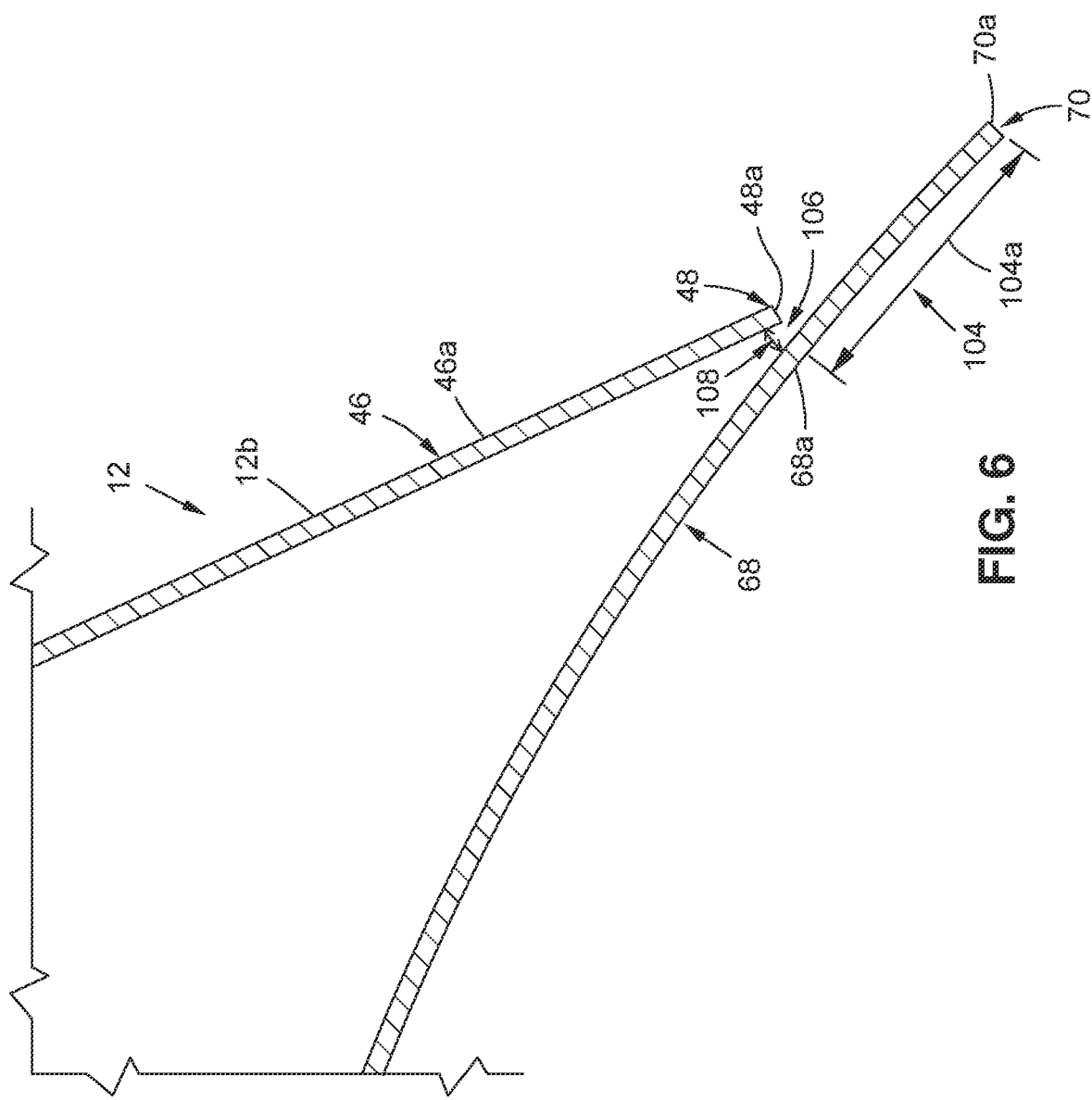
FIG. 6 is an illustration of a cross-sectional view taken along lines 6-6 of FIG. 5, of a heat shield portion of an exemplary version of a heat shield of the disclosure.

Now referring to FIG. 6, FIG. 6 is an illustration of a cross-sectional view taken along lines 6-6 of FIG. 5, of a heat shield portion 12b of an exemplary version of the heat shield 12 of the disclosure. FIG. 6 shows the side skin 46, such as the first side skin 46a, with the side skin edge 48, such as the side skin lower edge 48a. FIG. 6 further shows the lower skin 68 with the lower skin edge 70, such as the first lower skin edge 70a. As shown in FIG. 6, the lower skin edge 70, such as the first lower skin edge 70a, of the lower skin 68, extends the extended length 104, such as the first extended length 104a, past the side skin edge 48, such as the side skin lower edge 48a, of the side skin 46, such as the first side skin 46a. The lower skin 68 overlaps the side skin 46. The lower skin 68 extends past the side skin edge 48, such as the side skin lower edge 48a, of the first side skin 46a, to shield the side skin 46 from the heated exhaust gas 42 (see FIGS. 3, 4) discharged or output from the jet engine 18 (see FIGS. 1, 3, 4).

As further shown in FIG. 6, the side skin edge 48, such as the side skin lower edge 48a, is not attached to the lower skin 68 and is not attached to the lower skin edge 70. As depicted, there is no direct attachment between the side skin 46 and the lower skin 68. Having no direct attachment or connection between the side skin 46 and the lower skin 68 allows for independent thermal expansion 105a (see FIG. 2) of the lower skin 68. The side skin edge 48, such as the side skin lower edge 48a, is positioned across from a lower skin portion 68a of the lower skin 68 and is not positioned across from the lower skin edge 70, which extends farther past the side skin lower edge 48a.

FIG. 6 further shows the gap 106 present between the side skin edge 48, such as the side skin lower edge 48a, and the lower skin 68, such as the lower skin portion 68a. In other versions, the gap 106 may be formed between the side skin edge 48, such as the side skin lower edge 48a, and other portions along the extended length 104 of the lower skin 68 at a point before the lower skin edge 70. As discussed above, the gap 106 preferably has the gap width 108 in a range of from 0.1 inch (0.254 centimeters) to 0.25 inch (0.635 centimeters). However, the gap 106 may have another suitable gap width. The lower skin 68 extending the extended length 104 past the side skin edge 48 shields the side skin 46 and the gap 106 from the heated exhaust gas 42 (see FIGS. 3, 4) discharged or output from the jet engine 18 (see FIGS. 1, 3, 4). Further, the extended length 104 of the lower skin edges 70 extending past the side skin edges 48, blocks flow 40a (see FIG. 2) of the heated exhaust gas 42, or exhaust heat, from each jet engine 18. Further, the lower skin edges 70 being separate from the side skin edges 48 reduces the risk of fatigue 180 (see FIG. 2) of the heat shield 12, to provide the fatigue risk reduction 182 (see FIG. 2).

Figure 7:
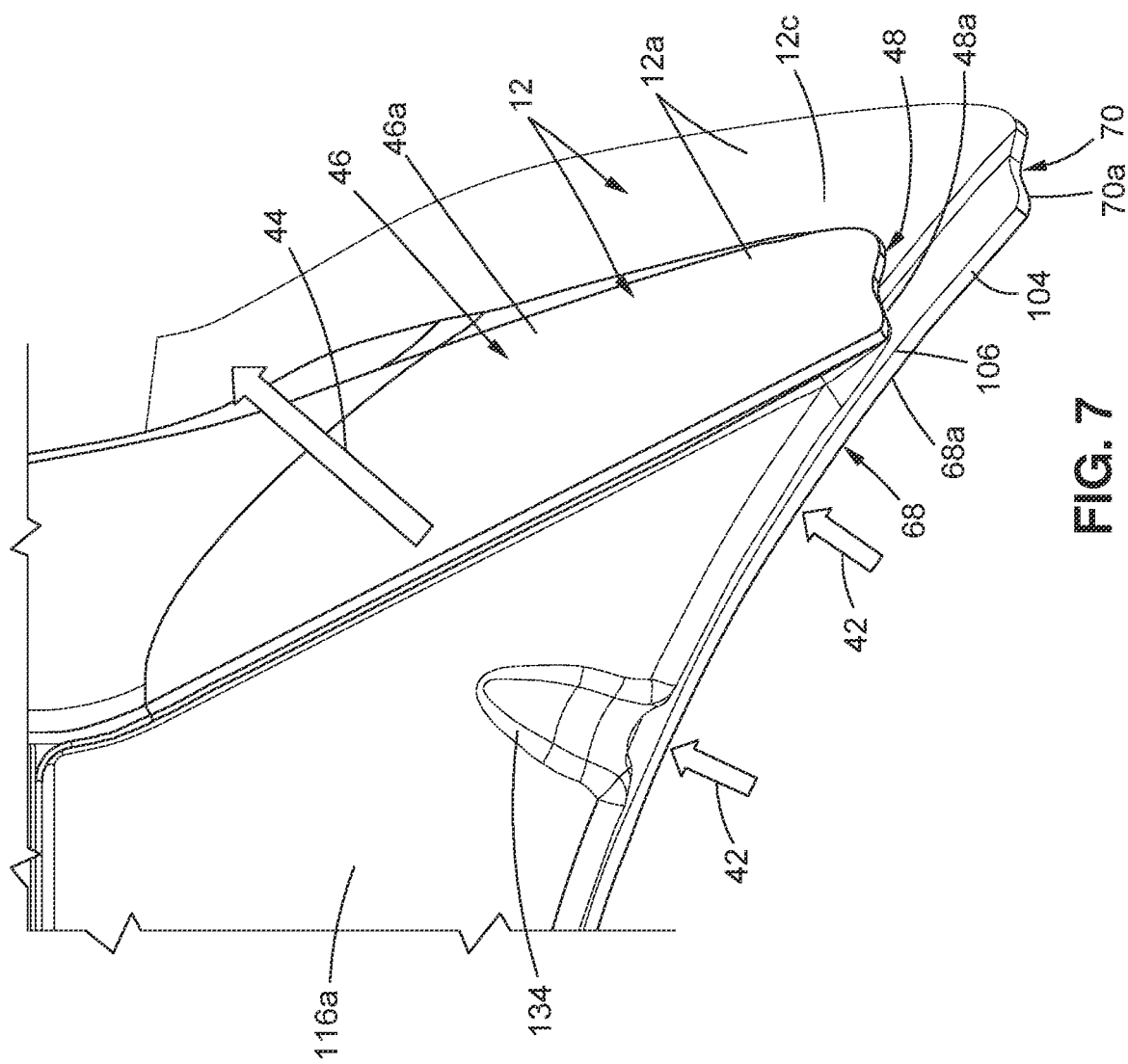
FIG. 7 is an illustration of a front perspective view of a heat shield portion of an exemplary version of a heat shield of the disclosure.

Now referring to FIG. 7, FIG. 7 is an illustration of a front perspective view of a heat shield portion 12c of an exemplary version of the heat shield 12, such as the strut aft fairing heat shield 12a. FIG. 7 shows the side skin 46, such as the first side skin 46a, with the side skin edge 48, such as the side skin lower edge 48a. FIG. 7 further shows the lower skin 68 with the lower skin edge 70, such as the first lower skin edge 70a. As shown in FIG. 7, the lower skin edge 70, such as the first lower skin edge 70a, of the lower skin 68, extends the extended length 104 past the side skin edge 48, such as the side skin lower edge 48a of the side skin 46, such as the first side skin 46a. The lower skin 68 overlaps the side skin 46. The lower skin 68 extends past the side skin edge 48, such as the side skin lower edge 48a, of the first side skin 46a, to shield the side skin 46, such as the first side skin 46a, from the heated exhaust gas 42 discharged or output from the jet engine 18 (see FIGS. 1, 3, 4).

As further shown in FIG. 7, the side skin edge 48, such as the side skin lower edge 48a, is not attached to the lower skin 68 and is not attached to the lower skin edge 70. The side skin edge 48, such as the side skin lower edge 48a, is positioned across from a lower skin portion 68a of the lower skin 68, and the side skin lower edge 48a is not positioned across from the lower skin edge 70, which extends farther past the side skin lower edge 48a.

FIG. 7 further shows the gap 106 present between the side skin edge 48, such as the side skin lower edge 48a, and the lower skin 68, such as the lower skin portion 68a. In other versions, the gap 106 may be formed between the side skin edge 48, such as the side skin lower edge 48a, and other portions along the extended length 104 of the lower skin 68 at a point before the lower skin edge 70. The gap 106 accommodates thermal expansion 105 (see FIG. 2) of the lower skin 68 resulting from the heated exhaust gas 42. FIG. 7 further shows the forward frame member 116a with the recessed arch portion 134.

Now referring to FIG. 8, FIG. 8 is an illustration of a side perspective view of an exemplary version of the heat shield 12 of FIG. 5 with one side skin 46, such as the first side skin 46a (see FIG. 5) removed for illustrative purposes to show internal structures of the heat shield 12 in the interior 110 of the heat shield 12. The other side skin 46, such as the second side skin 46b, is present. Thermal insulation blankets 150 (see FIG. 2) within the interior 110 of the heat shield 12 are not shown for clarity.

As shown in FIG. 8, the heat shield 12 comprises the interior 110, the exterior 112 (see also FIG. 5), and the internal cavity 114 in the interior 110 of the heat shield 12. FIG. 8 further shows the side skin edge 48, such as the side skin lower edge 48a, of the second side skin 46b, of the heat shield 12. FIG. 8 further shows the lower skin 68, and the lower skin edges 70, such as the first lower skin edge 70a and the second lower skin edge 70b, of the heat shield 12. FIG. 8 further shows the extended lengths 104, such as the extended length 104 past the side skin lower edge 48a of the second side skin 46b.

As shown in FIG. 8, the plurality of frame members 116 are fastened, or attached, to the lower skin 68 in the spaced apart arrangement 118. As shown in FIG. 8, the plurality of frame members 116 comprise the forward frame member 116a and the internal frame members 116b positioned aft of the forward frame member 116a. The internal cavity 114 of the heat shield 12 houses the plurality of frame members 116, such as the internal frame members 116b. As shown in FIG. 8, each frame member 116 comprises the frame body 120, having the generally trapezoid shape, and having the forward face 122, the aft face 124, the top end 125, the bottom end 126 that is curved to correspond to the curved body 72 of the lower skin 68, the first side 128, and the second side 130.

As shown in FIG. 8, the plurality of frame members 116 comprise the compliance features 132 configured to accommodate thermal expansion 105 (see FIG. 2) of the lower skin 68. The one or more compliance features 132 of the forward frame member 116a include one or more recessed arch portions 134 (see FIG. 8). As shown in FIG. 8, the recessed arch portions 134 are formed in the frame body 120 and spaced along the bottom end 126 of the frame body 120 of the forward frame member 116a. The forward frame member 116a may also have another suitable compliance feature.

As shown in FIG. 8, the compliance features 132 of the internal frame members 116b include slots 136, such as keyhole slots 136a, formed in and through the frame body 120 of the internal frame member 116b. As shown in FIG. 8, the slots 136 are vertically spaced along the bottom end 126 of the frame body 120 of the internal frame members 116b. As further shown in FIG. 8, the compliance features 132 of the internal frame members 116b include lower rounded corners 138 formed in one or more internal frame members 116b. As shown in FIG. 8, the lower rounded corners 138 are set apart from the lower skin 68 and the side skins 46, and are formed between the first side 128 and the bottom end 126, and the second side 130 and the bottom end 126 of the frame body 120 of the internal frame member 116b.

The plurality of frame members 116 are formed of a heat resistant material 86, such as a frame member heat resistant material 86d (see FIG. 2), for example, the high temperature heat resistant material 86c (see FIG. 2), that is preferably configured to withstand temperatures in a temperature range of from 500 degrees Fahrenheit (260 degrees Celsius) to 1500 degrees Fahrenheit (816 degrees Celsius), or higher. In some illustrative examples, the plurality of frame members 116 are formed of the metal material 90 (see FIG. 2), such as titanium 98 (see FIG. 2), nickel alloy 100 (see FIG. 2), stainless steel 102 (see FIG. 2), or another suitable metal material, to accommodate thermal expansion 105 (see FIG. 2) of the lower skin 68. In some illustrative examples, the plurality of frame members 116 are formed of the metal material 90, and the lower skin 68 and the side skins 46 are formed of one or more composite materials 88 (see FIG. 2).

In one version, as shown in FIG. 8, the heat shield 12 comprises the air ingress restrictor assembly 144 associated with one of, the pair of side skins 46, or the lower skin 68. The air ingress restrictor assembly 144 is configured to block or restrict air flow 148 (see FIG. 2) between the pair of side skins 46 and the lower skin 68 into the heat shield 12.

As shown in FIG. 8, the air ingress restrictor assembly 144 comprises the air ingress restrictor 146 comprising the contact restrictor 154 that blocks or restricts air flow 148 (see FIG. 2) between the side skin 46 and lower skin 68 by contacting the side skin 46 and the lower skin 68, to physically block or restrict the air flow 148 into the internal cavity 114 of the heat shield 12. As shown in FIG. 8, the contact restrictor 154 comprises seal members 156, such as the first seal member 156a and the second seal member 156b, configured to block air ingression into the internal cavity 114 of the heat shield 12. Preferably, the seal member 156 comprises the aero seal 168, such as a high temperature aero seal, to block the air flow 148 (see FIG. 2) into the internal cavity 114 of the heat shield 12, and to block air ingression into the internal cavity 114 of the heat shield 12. As shown in FIG. 8, each of the two seal members 156, including the first seal member 156a and the second seal member 156b, has a forward end 170, an aft end 172, and an elongate body 174 formed between the forward end 170 and the aft end 172. The seal member 156 is preferably formed of a material configured to withstand temperatures encountered by the heat shield 208. For example, the seal members 156 may be formed of one or more high temperature heat resistant materials. In another version, as shown in FIG. 2, the air ingress restrictor assembly 144 comprises the air ingress restrictor 146 comprising the non-contact restrictor 176 in the form of the flow director apparatus 178.

FIG. 8 further shows the spar assembly 152 is attached to the heat shield 12, and in particular, the spar assembly 152 is attached to inner portions 184 of the side skins 46 of the heat shield 12 and is positioned between the side skins 46. As shown in FIG. 8, the spar assembly 152 comprises the plurality of spars 186, or beams or other suitable support structures, positioned and attached to the heat shield 12. The spar assembly 152 functions as the interface 188 between the heat shield 12 and the structure 36 (see FIG. 3), such as the upper structure 36a (see FIG. 3), for example, the strut aft fairing 38 (see FIG. 3) of the aft fairing assembly 35 (see FIG. 3), positioned above, or in adjacent to, the heat shield 12. As shown in FIG. 8, the spar assembly 152 further comprises spar ends 190 and spar stiffener portions 192 between the spar ends 190.

Figure 9:
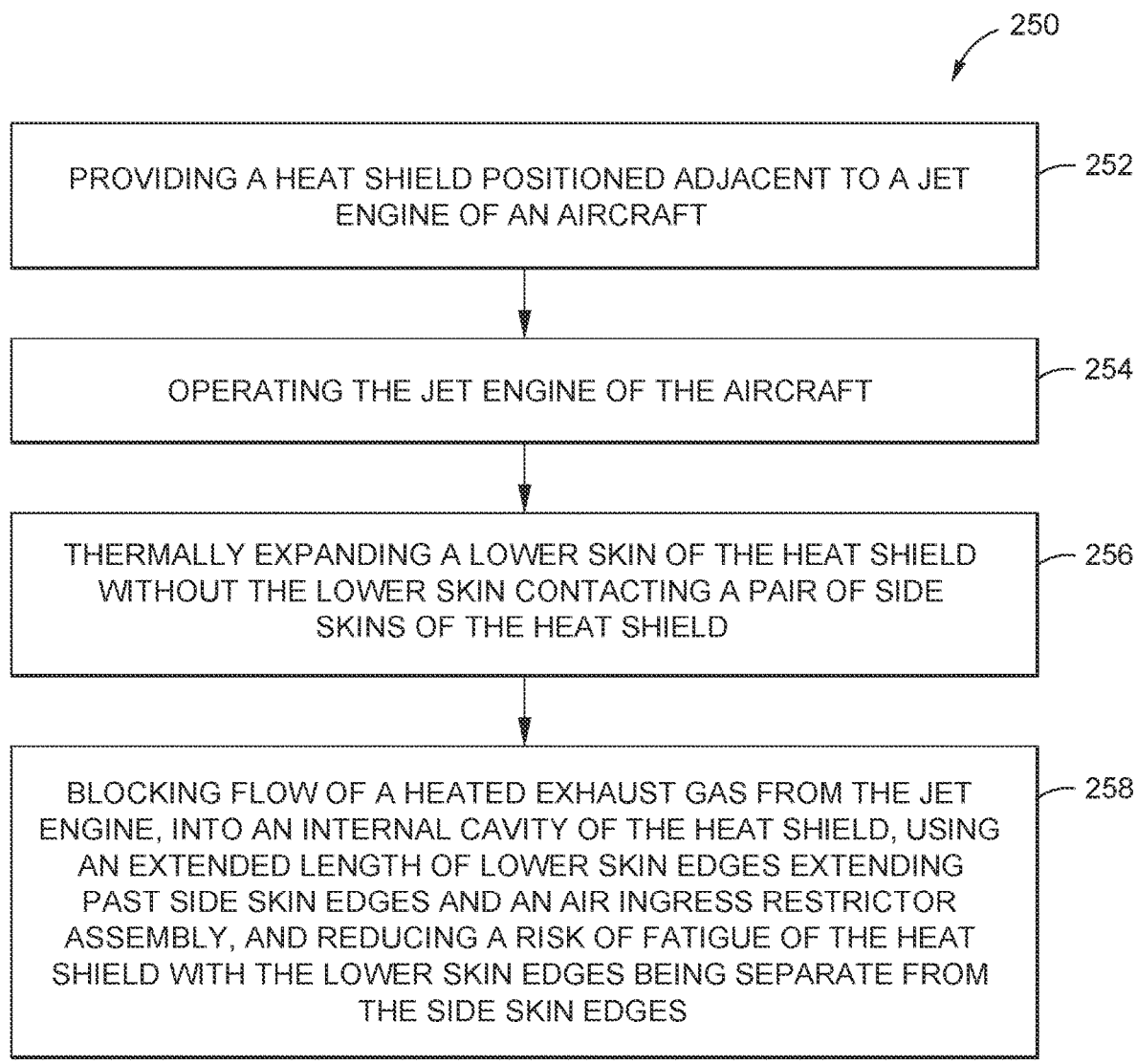
FIG. 9 is an illustration of a flow diagram of an exemplary version of a method of the disclosure.

Now referring to FIG. 9, FIG. 9 is an illustration of a flow diagram of an exemplary version of a method 250 of the disclosure. In another version of the disclosure, there is provided the method 250 of using an exemplary version of the heat shield 12 (see FIGS. 1-8), as discussed in detail above, in the aircraft 10 (see FIGS. 1, 2), or another suitable aircraft, spacecraft, or vehicle. The blocks in FIG. 9 represent operations and/or portions thereof, or elements, and lines connecting the various blocks do not imply any particular order or dependency of the operations or portions thereof, or elements. FIG. 9 and the disclosure of the steps of the method 250 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 9, the method 250 comprises the step 252 of providing the heat shield 12 positioned adjacent to a jet engine 18 (see FIGS. 1-3) of the aircraft 10 (see FIGS. 1, 2). In one version, the heat shield 12 (see FIG. 5) is a strut aft fairing heat shield 12a (see FIG. 5). The heat shield 12 comprises the pair of side skins 46 (see FIGS. 2, 5). Each side skin 46 is formed of the heat resistant material 86 (see FIG. 2), such as the high temperature heat resistant material 86c (see FIG. 2), and has the side skin edge 48 (see FIGS. 2, 5). The heat shield 12 further comprises the lower skin 68 (see FIGS. 1, 5) formed of the heat resistant material 86, such as the high temperature heat resistant material 86c, and having the lower skin edges 70 (see FIGS. 2, 5). The lower skin edges 70 extend the extended length 104 (see FIGS. 2, 5, 6) past the side skin edges 48. Preferably, each lower skin edge 70 extends past each side skin edge 48 the extended length 104 in a range of from 1.0 inch (2.54 centimeters) to 6.0 inches (15.24 centimeters). However, another suitable extended length may be used.

The lower skin edges 70 and the lower skin 68 are separate from, and not directly attached to, the side skin edges 48 and the side skins 46. The gap 106 (see FIGS. 2, 6) is present between each of the side skin edges 48 (see FIG. 6) and the lower skin 68 (see FIG. 6). The gap 106 preferably has the gap width 108 (see FIGS. 2, 6) in a range of from 0.1 inch (0.254 centimeters) to 0.25 inch (0.635 centimeters). However, the gap 106 may have another suitable gap width.

The heat shield 12 further comprises the plurality of frame members 116 (see FIGS. 2, 5, 8) attached to the lower skin 68. The heat shield 12 further comprises the air ingress restrictor assembly 144 (see FIGS. 2, 8) associated with one of, the pair of side skins 46, or the lower skin 68. The air ingress restrictor assembly 144 is configured to restrict air flow 148 (see FIG. 2) between the pair of side skins 46 and the lower skin 68 into the heat shield 12.

The step 252 of providing the heat shield 12 may further comprise, providing the heat shield 12 with the air ingress restrictor assembly 144 (see FIGS. 2, 8) comprising a contact restrictor 154 (see FIGS. 2, 8) comprising one or more seal members 156 (see FIGS. 2, 8). As shown in FIG. 2, each seal member 156 comprises one of, a bulb seal 158, a thermal barrier seal 160, a segmented seal 162, a knit ceramic seal 164, a blade seal 166, an aero seal 168, such as a high temperature aero seal, or another suitable seal. In some illustrative examples, the method 250 restricts air flow 148 into the heat shield 12 between the lower skin 68 and the side skins 46. In some illustrative examples, restricting the air flow 148 comprises blocking the air flow 148 into the internal cavity 114 of the heat shield 12 by the seal member 156 between the lower skin 68 and the side skin 46. In these illustrative examples, the air ingress restrictor 146 (see FIGS. 2, 8) of the heat shield 12 is the contact restrictor 154 (see FIGS. 2, 8).

The step 252 of providing the heat shield 12 may further comprise, providing the heat shield 12 with the air ingress restrictor assembly 144 (see FIGS. 2, 8) comprising a non-contact restrictor 176 (see FIG. 2) comprising a flow director apparatus 178 (see FIG. 2) configured to redirect the air flow 148 (see FIG. 2) entering the heat shield 12 between each side skin 46 and the lower skin 68. In some illustrative examples, restricting or blocking the air flow 148 comprises redirecting the air flow 148 entering the heat shield 12 between the lower skin 68 and the side skin 46. In these illustrative examples, the air ingress restrictor 146 (see FIG. 2) of the heat shield 12 is the non-contact restrictor 176 (see FIG. 2).

As shown in FIG. 9, the method 250 further comprises the step 254 of operating the jet engine 18 (see FIGS. 1-3) of the aircraft 10 (see FIGS. 1, 2) by a pilot, a copilot, an aviator, or another suitable operator of the aircraft 10. As shown in FIG. 9, the method 250 further comprises the step 256 of thermally expanding the lower skin 68 of the heat shield 12 without the lower skin 68 contacting the pair of side skins 46 of the heat shield 12. The lower skin 68 undergoes the thermal expansion 105 (see FIG. 2) when exposed to the heated exhaust gas 42 (see FIG. 2) discharged or output from the jet engine 18 (see FIGS. 1-3).

As shown in FIG. 9, the method 250 further comprises the step 258 of blocking flow 40a (see FIG. 2) of the heated exhaust gas 42 (see FIGS. 2, 7), or exhaust heat, from the jet engine 18 (see FIGS. 1, 3), into the internal cavity 114 (see FIGS. 2, 8) of the heat shield 12, using the extended length 104 (see FIGS. 2, 6) of the lower skin edges 70 (see FIGS. 2, 6) extending past the side skin edges 48 (see FIG. 6), and the air ingress restrictor assembly 144 (see FIGS. 2, 8), and reducing a risk of fatigue 180 (see FIG. 2) of the heat shield 12 with the lower skin edges 70 and the lower skin 68 being separate from the side skin edges 48 and the side skins 46.

The method 250 may further comprise the step of preventing a direct structural attachment, or direct structural bond, between the pair of side skins 46 and the lower skin 68, to effectively create an expansion joint 140 (see FIG. 2) through the plurality of frame members 116 (see FIGS. 2, 8) of the heat shield 12. The method 250 may further comprise the step of preventing a conduction path, to obtain conduction path prevention 142 (see FIG. 2), between the pair of side skins 46 (see FIGS. 2, 5) and the lower skin 68 (see FIGS. 2, 5), with the gap 106 (see FIGS. 2, 6), to decrease heating of the pair of side skins 46. Preventing the conduction path helps to reduce the temperature on the side skin edges 48, such as the side skin lower edges 48a (see FIG. 2), and allows more materials to be viable. The method 250 may further comprise shielding with the heat shield 12, the strut aft fairing 38 (see FIGS. 2, 3) of the aircraft 10 (see FIGS. 1, 2), where the strut aft fairing 38 is positioned adjacent to the heat shield 12.

The method 250 operates the jet engine 18 (see FIG. 1) of the aircraft 10 (see FIG. 1) and shields the strut aft fairing 38 (see FIG. 3) from heated exhaust gas 42 (see FIGS. 2, 7) from the jet engine 18 (see FIGS. 1-3) with the heat shield 12 disclosed herein. The method 250 thermally expands the lower skin 68 of the heat shield 12 without the lower skin 68 contacting the side skins 46 of the heat shield 12, and both the lower skin 68 and the side skins 46 are formed of the heat resistant material 86 (see FIG. 2), either the same heat resistant material 86, or different heat resistant materials 86.

Figure 10:
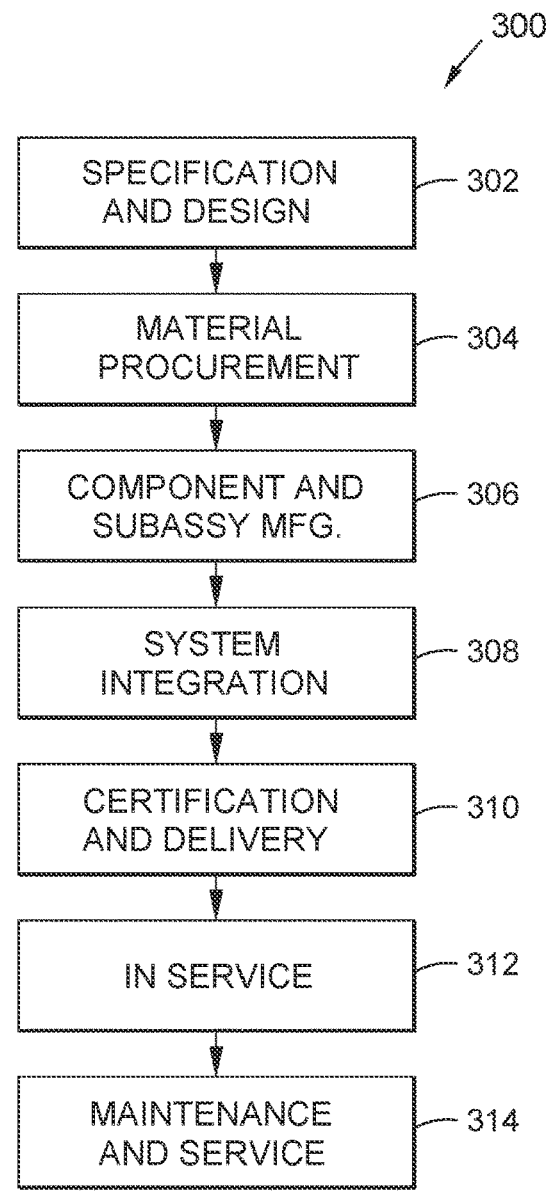
FIG. 10 is an illustration of a flow diagram of an exemplary aircraft manufacturing and service method.
Figure 11:
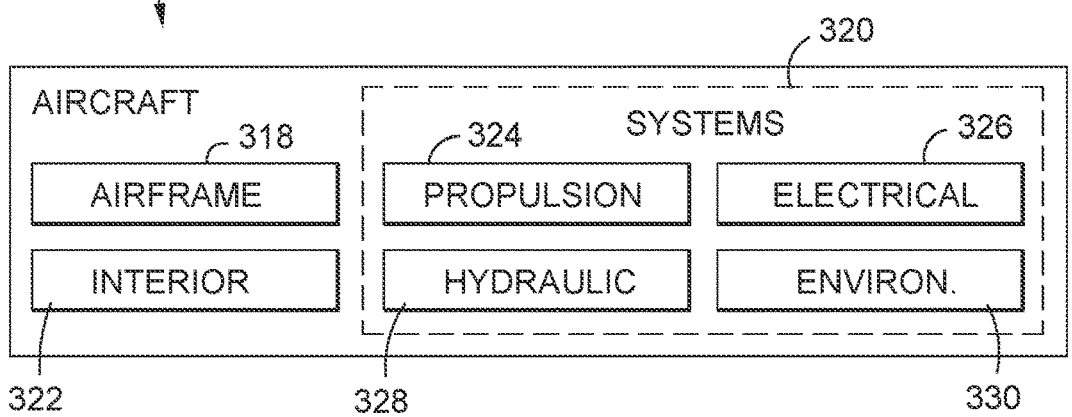
FIG. 11 is an illustration of an exemplary block diagram of an aircraft.

Now referring to FIGS. 10 and 11, FIG. 10 is an illustration of a flow diagram of an exemplary aircraft manufacturing and service method 300, and FIG. 11 is an illustration of an exemplary block diagram of an aircraft 316. Referring to FIGS. 10 and 11, versions of the disclosure may be described in the context of the aircraft manufacturing and service method 300 as shown in FIG. 10, and the aircraft 316 as shown in FIG. 11.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 11, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such automotive.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314. For example, the heat shield 12 is assembled during component and subassembly manufacturing 306. The heat shield 12 shields components of aircraft 316 from heated exhaust gas 42 while the aircraft 316 is in service 312. In some illustrative examples, the heat shield 12 is installed or replaced during maintenance and service 314. As an example, service method 300 may be used during in service 312 to shield components of aircraft 316 from heated exhaust gas 42. The heat shield 12 may be a component of aircraft 316 such as a component of airframe 318 (see FIG. 11).

Disclosed versions of the heat shield 12 (see FIGS. 2-8), the aircraft 10 (see FIGS. 1, 2) implementing the heat shield 12, and the method 250 (see FIG. 9) of using the heat shield 12 provide a heat shield design that extends the lower skin 68 (see FIGS. 2, 5) of the heat shield 12 beyond the side skins 46 (see FIG. 2, 5), to shield the side skins 46 and the gap 106 (see FIGS. 2, 7) from the heated exhaust gas 42 (see FIGS. 2, 7), and to prevent exposure of the internal cavity 114 (see FIG. 8) of the heat shield 12 to the heated exhaust gas 42. Since the lower skin 68 and the lower skin edges 70 (see FIG. 5) extend past the side skins 46 and the side skin edges 48 (see FIG. 5), the internal cavity 114 of the heat shield 12 is protected from the heated exhaust gas 42 (see FIGS. 2, 7). Further, this improved design of the heat shield 12 provides a more reliable design for the heat shield 12 by reducing the severity of exposure of any air ingress restrictors 146 (see FIG. 2), such as a contact restrictor 154 (see FIG. 2), for example, one or more seal members 156 (see FIGS. 1, 8) used to seal or plug the gap 106 (see FIGS. 2, 6) between the lower skin 68 and the side skins 46.

In addition, disclosed versions of the heat shield 12 (see FIGS. 2-8), the aircraft 10 (see FIGS. 1, 2) implementing the heat shield 12, and the method 250 (see FIG. 9) of using the heat shield 12 provide a heat shield design with no direct attachment of the side skins 46 (see FIGS. 2, 5, 6) and the lower skin 68 (see FIGS. 2, 5, 6), to allow independent thermal expansion 105a (see FIG. 2) of the lower skin 68 and the side skins 46. The improved design of the heat shield 12 eliminates the joint between the lower skin 68 and the side skins 46, and allows for an expansion joint 140 (see FIG. 2) to be is created through the plurality of frame members 116 (see FIGS. 2, 8), by separating the pair of side skins 46 and the lower skin 68 and preventing a direct structural attachment, or direct structural bond, between the pair of side skins 46 and the lower skin 68. Internal support structures, including frame members 116, are configured to allow independent thermal expansion 105a of the hot lower skin 68 and the cold side skins 46, and does not constrain differential thermal expansion.

Further, having the gap 106 between the pair of side skins 46 and the lower skin 68 prevents formation of a conduction path between the pair of side skins 46 and the lower skin 68, to obtain a decrease or reduced heating of the pair of side skins 46. Preventing the conduction path helps to reduce the temperature on the side skin edges 48, such as the side skin lower edges 48a, and allows more materials to be viable. The heat shield 12 with the design of the gap 106 present between the side skins 46 and the lower skin 68, and the lower skin 68 having the extended length 104 extending beyond the side skin edges 48 of the side skins 46, allows for conduction path prevention 142 (see FIG. 2). Decoupling the lower skin 68 from the side skins 46 eliminates or reduces constrained thermal expansion and reduces thermal stresses, by eliminating or reducing the creation of abrupt thermal profiles in the lower skin 68 and the side skins 46. Thus, the improved design of the heat shield 12 reduces or eliminates undesirable effects, such as distortion, buckling, and fatigue 180 (see FIG. 2). The lower skin edges 70 and the lower skin 68 being separate from the side skin edges 48 and the side skins 46 reduces a risk of fatigue 180 (see FIG. 2) of the heat shield 12, to provide a fatigue risk reduction 182 (see FIG. 2). The illustrative examples of the heat shield 12 and method 250 of using the heat shield 12 disclosed herein provide independent thermal expansion 105a of hot and cold components through elimination of a structural joint between the side skin 46 and the lower skin 68. Elimination of the structural joint between the side skin 46 and the lower skin 68 provides at least one of thermal isolation, lowering of component stresses, lowering weight, or lowering assembly costs. The illustrative examples of the heat shield 12 relieve the stresses seen in a joined structure, and enable the lower skin 68 to expand freely. The illustrative examples of the heat shield 12 separate and thermally isolate the hot lower skin 68, which is directly exposed to the heated exhaust gas 42 (see FIGS. 2, 7), or engine exhaust plume, from the much cooler side skins 46, which are exposed to the cooling fan flow air stream 44 (see FIGS. 2, 7). Allowing for independent thermal expansion 105a (see FIG. 2) relieves the thermal stresses that typically cause aero surface distortion, shortened service life, and sometimes structural issues.

Moreover, disclosed versions of the heat shield 12 (see FIGS. 2-8), the aircraft 10 (see FIGS. 1, 2) implementing the heat shield 12, and the method 250 (see FIG. 9) of using the heat shield 12 provide an improved design of the heat shield 12 that has improved buckling resistance, improved fatigue performance, improved corresponding aerodynamics, and reduced fatigue risk, and provides fatigue risk reduction 182 (see FIG. 2). Versions of the heat shield 12 disclosed herein may provide superior aerodynamics compared to alternate multi-piece segmented designs.

In addition, disclosed versions of the heat shield 12 (see FIGS. 2-8), the aircraft 10 (see FIGS. 1, 2) implementing the heat shield 12, and the method 250 (see FIG. 9) of using the heat shield 12 provide the air ingress restrictor assembly 144 that blocks or restricts the air flow 148 into the internal cavity 114 of the heat shield 12. The air ingress restrictor assembly 144 and the extended length 104 of the lower skin edges 70 and the lower skin 68 extending past the side skin edges 48, block or restrict the flow 40a (see FIG. 2) of the heated exhaust gas 42, from each jet engine 18 positioned forward of the heat shield 12, into the internal cavity 114 (see FIGS. 2, 8) of the heat shield 12, to reduce heating of structures 36 (see FIG. 2), such as upper structures 36a (see FIG. 2), above or adjacent to the heat shield 12, for example, the strut aft fairing 38 (see FIG. 2). The air ingress restrictor 146 (see FIG. 1) may comprise a contact restrictor 154, such as one or more seal members 156 (see FIGS. 1, 8), or may comprise a non-contact restrictor 176 (see FIG. 1), such as a flow director apparatus 178 (see FIG. 1).

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

The invention claimed is:

1. A heat shield for an aircraft, the heat shield comprising:
a pair of side skins, each side skin formed of a heat resistant material and having a side skin lower edge;
a lower skin formed of a heat resistant material and having lower skin edges, the lower skin edges extending an extended length past the side skin lower edges, the lower skin edges being separate from the side skin lower edges, and a gap formed between the side skin lower edges and the lower skin, and the lower skin configured to thermally expand without contacting the pair of side skins, the gap having a gap width in a range of from 0.1 inch to 0.25 inch, and the gap accommodating thermal expansion of the lower skin resulting from a heated exhaust gas discharged from a jet engine positioned forward of the heat shield, and the gap preventing formation of a conduction path between the pair of side skins and the lower skin, and the extended length being in a range of from 1.0 inch to 6.0 inches, and the extended length shielding each side skin and each gap from the heated exhaust gas, the extended length blocking flow of the heated exhaust gas into an internal cavity of the heat shield, and the extended length allowing for conduction path prevention;
a plurality of frame members attached to the lower skin; and
an air ingress restrictor assembly comprising a first seal member and a second seal member plugging the gap between the side skin lower edges and the lower skin, each of the first seal member and the second seal member positioned adjacent to, and contacting, the side skin lower edges and lower skin portions of the lower skin, the lower skin portions positioned across from the side skin lower edges, the air ingress restrictor assembly configured to restrict air flow between the pair of side skins and the lower skin, into the heat shield, and the air ingress restrictor assembly restricting the flow of the heated exhaust gas into the internal cavity of the heat shield,
wherein, the lower skin edges being separate from the side skin lower edges reduces a risk of fatigue of the heat shield.

2. The heat shield of claim 1, wherein the heat resistant material of the pair of side skins and the heat resistant material of the lower skin each comprises one of, a composite material, or a metal material.

3. The heat shield of claim 2, wherein the composite material comprises a ceramic matrix composite material.

4. The heat shield of claim 2, wherein the metal material comprises titanium, nickel alloy, or stainless steel.

5. The heat shield of claim 1, wherein the heat resistant material is configured to withstand temperatures in a temperature range of from 500 degrees Fahrenheit to 1500 degrees Fahrenheit.

6. The heat shield of claim 1, wherein the heat shield is a strut aft fairing heat shield.

7. The heat shield of claim 1, wherein the heat shield eliminates a structural joint between each side skin and the lower skin.

8. The heat shield of claim 1, wherein the gap preventing formation of the conduction path between the pair of side skins and the lower skin reduces heating of the pair of side skins and reduces a temperature on the side skin lower edges.

9. The heat shield of claim 1, wherein the first seal member and the second seal member each comprises one of, a bulb seal, a thermal barrier seal, a segmented seal, a knit ceramic seal, a blade seal, or an aero seal.

10. The heat shield of claim 1, wherein the first seal member and the second seal member each has a forward end, an aft end, and an elongate body formed between the forward end and the aft end.

11. An aircraft comprising:
a fuselage;
at least one wing attached to the fuselage;
two or more jet engines attached to the at least one wing, each jet engine configured to exhaust a heated exhaust gas, and each jet engine having a fan configured to exhaust a cooling fan flow air stream; and
a heat shield positioned adjacent to each jet engine, the heat shield comprising:
a pair of side skins, each side skin formed of a heat resistant material and having a side skin lower edge;
a lower skin formed of a heat resistant material and having lower skin edges, the lower skin edges extending an extended length past the side skin lower edges, the lower skin edges being separate from the side skin lower edges, and a gap formed between the side skin lower edges and the lower skin, and the lower skin configured to thermally expand without contacting the pair of side skins, the gap having a gap width in a range of from 0.1 inch to 0.25 inch, and the gap accommodating thermal expansion of the lower skin resulting from the heated exhaust gas, and the gap preventing formation of a conduction path between the pair of side skins and the lower skin, and the extended length being in a range of from 1.0 inch to 6.0 inches, and the extended length shielding each side skin and each gap from the heated exhaust gas, the extended length blocking flow of the heated exhaust gas into an internal cavity of the heat shield, and the extended length allowing for conduction path prevention;

a plurality of frame members attached to the lower skin; and an air ingress restrictor assembly comprising a first seal member and a second seal member plugging the gap between the side skin lower edges and the lower skin, each of the first seal member and the second seal member positioned adjacent to, and contacting, the side skin lower edges and lower skin portions of the lower skin, the lower skin portions positioned across from the side skin lower edges, the air ingress restrictor assembly configured to restrict air flow between the pair of side skins and the lower skin, into the heat shield, and the air ingress restrictor assembly restricting the flow of the heated exhaust gas into the internal cavity of the heat shield, wherein, the lower skin edges being separate from the side skin lower edges reduces a risk of fatigue of the heat shield.

12. The aircraft of claim 11, further comprising a strut aft fairing positioned adjacent to the heat shield.

13. The aircraft of claim 11, wherein the heat resistant material of the pair of side skins and the heat resistant material of the lower skin each comprises one of, a composite material, or a metal material.

14. The aircraft of claim 11, wherein the first seal member and the second seal member each comprises one of, a bulb seal, a thermal barrier seal, a segmented seal, a knit ceramic seal, a blade seal, or an aero seal.

15. The aircraft of claim 11, wherein the first seal member and the second seal member each has a forward end, an aft end, and an elongate body formed between the forward end and the aft end.

16. A method of using a heat shield in an aircraft, the method comprising the steps of:

providing the heat shield positioned adjacent to a jet engine of the aircraft, the heat shield comprising:

a pair of side skins, each side skin formed of a heat resistant material and having a side skin lower edge;

a lower skin formed of a heat resistant material and having lower skin edges, the lower skin edges extending an extended length past the side skin lower edges, the lower skin edges being separate from the side skin lower edges, and a gap formed between the side skin lower edges and the lower skin, the gap having a gap width in a range of from 0.1 inch to 0.25 inch, and the gap accommodating thermal expansion of the lower skin resulting from a heated exhaust gas discharged from the jet engine, and the gap preventing formation of a conduction path between the pair of side skins and the lower skin, and the extended length being in a range of from 1.0 inch to 6.0 inches, and the extended length shielding each side skin and each gap from the heated exhaust gas, the extended length blocking flow of the heated exhaust gas into an internal cavity of the heat shield, and the extended length allowing for conduction path prevention;

a plurality of frame members attached to the lower skin; and an air ingress restrictor assembly comprising a first seal member and a second seal member plugging the gap between the side skin lower edges and the lower skin, each of the first seal member and the second seal member positioned adjacent to, and contacting, the side skin lower edges and lower skin portions of the lower skin, the lower skin portions positioned across from the side skin lower edges, the air ingress restrictor assembly configured to restrict air flow between the pair of side skins and the lower skin, into the heat shield, and the air ingress restrictor assembly restricting the flow of the heated exhaust gas into the internal cavity of the heat shield;

operating the jet engine of the aircraft;

thermally expanding the lower skin of the heat shield without the lower skin contacting the pair of side skins of the heat shield; and blocking the flow of the heated exhaust gas from the jet engine, into the internal cavity of the heat shield, using the extended length of the lower skin edges extending past the side skin lower edges, and reducing a risk of fatigue of the heat shield with the lower skin edges being separate from the side skin lower edges.

17. The method of claim 16, wherein the method further comprises:

shielding with the heat shield, a strut aft fairing of the aircraft, the strut aft fairing positioned adjacent to the heat shield.

18. The method of claim 16, wherein the method further comprises:

preventing a direct structural attachment between the pair of side skins and the lower skin, to effectively create an expansion joint through the plurality of frame members of the heat shield.

19. The method of claim 16, wherein providing the heat shield further comprises, providing the heat shield with the air ingress restrictor assembly comprising the first seal member and the second seal member each comprising one of, a bulb seal, a thermal barrier seal, a segmented seal, a knit ceramic seal, a blade seal, or an aero seal.

20. The method of claim 16, wherein providing the heat shield further comprises, providing the heat shield with the air ingress restrictor assembly comprising the first seal member and the second seal member each having a forward end, an aft end, and an elongate body formed between the forward end and the aft end.

* * * * *